US011115135B2

(12) United States Patent
Chen

(10) Patent No.: US 11,115,135 B2
(45) Date of Patent: Sep. 7, 2021

(54) SIGNAL SENDING METHOD FOR TERMINAL DEVICE AND TERMINAL DEVICE

(71) Applicant: HUAWEI TECHNOLOGIES CO., LTD., Shenzhen (CN)

(72) Inventor: Xiaohong Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/085,586

(22) PCT Filed: Mar. 31, 2016

(86) PCT No.: PCT/CN2016/078110
§ 371 (c)(1),
(2) Date: Sep. 16, 2018

(87) PCT Pub. No.: WO2017/166201
PCT Pub. Date: Oct. 5, 2017

(65) Prior Publication Data
US 2019/0103926 A1    Apr. 4, 2019

(51) Int. Cl.
*H04B 17/10* (2015.01)
*H04B 17/00* (2015.01)
(Continued)

(52) U.S. Cl.
CPC ......... *H04B 17/102* (2015.01); *H04B 7/0413* (2013.01); *H04B 17/0085* (2013.01);
(Continued)

(58) Field of Classification Search
CPC ... H04W 28/04; H04W 72/04; H04W 72/042; H04W 88/08; H04W 24/06;
(Continued)

(56) References Cited

U.S. PATENT DOCUMENTS 9,015,019 B1 * 4/2015 Kim .................. H04W 74/00
703/13
10,778,291 B1 * 9/2020 Wang ................. H04B 7/0413
(Continued)

FOREIGN PATENT DOCUMENTS

CN          101188463 A      5/2008
CN          101364968 A      2/2009
(Continued)

OTHER PUBLICATIONS

3GPP TR 37.977 V13.3.0 (Mar. 2016),3rd Generation Partnership Project;Technical Specification Group Radio Access Network;Universal Terrestrial Radio Access (UTRA) an Evolved Universal Terrestrial Radio Access (E-UTRA); Verification of radiated multi-antenna reception performance of User Equipment (UE)(Release 13),total 161 pages.

*Primary Examiner* — Peter G Solinsky
*Assistant Examiner* — Sanjay K Dewan
(74) *Attorney, Agent, or Firm* — Maier & Maier, PLLC

(57)        ABSTRACT

The terminal device can generate a monophonic signal of a specified frequency, and can transmit the monophonic signal by using a specified receive antenna or transmit antenna of the terminal device. The terminal device has a function of transmitting the monophonic signal of the designated frequency by using any specified antenna. Therefore, a measurement system for an antenna complex number pattern of the terminal device can accurately measure a complex number pattern of each antenna of the terminal device in a manner in which the terminal device transmits the monophonic signal of the specified frequency by using each receive antenna or transmit antenna. The measurement system can further obtain an accurate measurement result when a MIMO OTA performance test is performed on the terminal (Continued)

device according to the complex number patterns of all the antennas of the terminal device.

8 Claims, 9 Drawing Sheets

(51) Int. Cl.
    *H04B 17/391*     (2015.01)
    *H04B 17/19*     (2015.01)
    *H04B 7/0413*     (2017.01)
    *H04W 24/06*     (2009.01)

(52) U.S. Cl.
    CPC ......... *H04B 17/19* (2015.01); *H04B 17/3911* (2015.01); *H04W 24/06* (2013.01)

(58) Field of Classification Search
    CPC . H04L 5/0007; H04B 17/102; H04B 17/0085; H04B 7/0413; H04B 17/19; H04B 17/3911
    USPC .......................................................... 370/329
    See application file for complete search history.

(56) References Cited

U.S. PATENT DOCUMENTS

| | | | |
|---|---|---|---|
| 2008/0123756 A1* | 5/2008 | Daniels | H04B 17/0087 375/260 |
| 2008/0129615 A1 | 6/2008 | Breit et al. | |
| 2009/0042521 A1 | 2/2009 | Otaka et al. | |
| 2012/0098713 A1 | 4/2012 | Mow et al. | |
| 2012/0128088 A1 | 5/2012 | Ko et al. | |
| 2012/0134400 A1* | 5/2012 | Ding | H04B 17/0085 375/224 |
| 2012/0282863 A1* | 11/2012 | Guo | H04B 17/0082 455/67.12 |
| 2012/0287871 A1* | 11/2012 | Marini | H04W 24/06 370/329 |
| 2013/0027256 A1* | 1/2013 | Guo | H04W 24/06 343/703 |
| 2013/0059545 A1 | 3/2013 | Kyösti et al. | |
| 2013/0303089 A1* | 11/2013 | Wang | H04W 24/06 455/67.12 |
| 2014/0122049 A1 | 5/2014 | Kyösti et al. | |
| 2014/0141727 A1* | 5/2014 | Kildal | H04B 17/15 455/67.12 |
| 2014/0160955 A1* | 6/2014 | Lum | H04W 24/06 370/252 |
| 2014/0328329 A1* | 11/2014 | Novlan | H04W 56/0015 370/336 |
| 2015/0030060 A1* | 1/2015 | Kyosti | H04B 17/0087 375/224 |
| 2015/0341809 A1* | 11/2015 | Hamon | H04W 24/06 370/252 |
| 2015/0349897 A1 | 12/2015 | Taylor | |
| 2015/0358056 A1* | 12/2015 | Kusunoki | H04B 7/0452 370/329 |
| 2018/0337738 A1* | 11/2018 | Wen | H04B 17/12 |
| 2019/0074913 A1* | 3/2019 | Liang | H04B 7/0452 |
| 2019/0115989 A1* | 4/2019 | Rodriguez-Herrera | H04B 17/11 |
| 2019/0181963 A1* | 6/2019 | Liang | H04B 17/318 |
| 2020/0235875 A1* | 7/2020 | Sha | H04L 5/0048 |
| 2020/0304175 A1* | 9/2020 | Wang | H04B 17/3912 |

FOREIGN PATENT DOCUMENTS

| | | | | |
|---|---|---|---|---|
| CN | 102624472 A | | 8/2012 | |
| CN | 103384835 A | * | 11/2013 | ............. G01R 29/10 |
| CN | WO 2014/086268 | * | 6/2014 | ............. H04B 17/00 |
| CN | 104902504 A | * | 6/2015 | ............. H04B 17/06 |
| CN | 104902504 A | | 9/2015 | |
| EP | 1542405 A2 | | 6/2005 | |
| EP | 2442456 B1 | | 5/2013 | |
| JP | 2010502997 A | | 1/2010 | |
| KR | 20060107416 A | | 10/2006 | |
| KR | 20070017413 A | | 2/2007 | |
| KR | 20080048351 A | | 6/2008 | |
| KR | 20110112048 A | | 10/2011 | |
| KR | 20130008590 A | | 1/2013 | |
| KR | 20130062764 A | | 6/2013 | |
| KR | 20140037184 A | | 3/2014 | |
| KR | 20150103159 A | | 9/2015 | |
| WO | 2014086268 A1 | | 6/2014 | |

* cited by examiner

```
                                                        ┌─ 901
┌──────────────────────────────────────────────────────────┐
│ A terminal device sequentially transmits a monophonic signal according to a specified │
│   sequence by using all of multiple receive antennas of the terminal device          │
└──────────────────────────────────────────────────────────┘
                              │
                              ▼                         ┌─ 902
┌──────────────────────────────────────────────────────────┐
│   A first signal analyzer performs the following operations specific to each receive │
│ antenna: separately measuring amplitudes and phases of the monophonic signal on an   │
│    I channel and a Q channel in each measurement direction of a three-dimensional    │
│  radiation spherical surface, where the monophonic signal is transmitted by the receive │
│  antenna; and obtaining a complex number pattern of the receive antenna according to │
│    the amplitudes and the phases, obtained by means of measurement specific to the   │
│   receive antenna, on the I channel and the Q channel in each measurement direction of │
│                 the three-dimensional radiation spherical surface                    │
└──────────────────────────────────────────────────────────┘
```

FIG. 9

```
                                                        ┌─ 1001
┌──────────────────────────────────────────────────────────┐
│ A terminal device sequentially transmits a monophonic signal according to a specified │
│   sequence by using all of multiple transmit antennas of the terminal device         │
└──────────────────────────────────────────────────────────┘
                              │
                              ▼                         ┌─ 1002
┌──────────────────────────────────────────────────────────┐
│   A third signal analyzer performs the following operations specific to each transmit │
│  antenna: separately measuring amplitudes and phases of the monophonic signal on an  │
│    I channel and a Q channel in each measurement direction of a three-dimensional    │
│       radiation spherical surface, where the monophonic signal is transmitted by the │
│   transmit antenna; and obtaining a complex number pattern of the transmit antenna   │
│       according to the amplitudes and the phases, obtained by means of measurement   │
│         specific to the transmit antenna, on the I channel and the Q channel in each │
│          measurement direction of the three-dimensional radiation spherical surface  │
└──────────────────────────────────────────────────────────┘
```

FIG. 10

SIGNAL SENDING METHOD FOR TERMINAL DEVICE AND TERMINAL DEVICE

CROSS-REFERENCE TO RELATED APPLICATIONS

This application is a national stage of International Application No. PCT/CN2016/078110, filed on Mar. 31, 2016, which is hereby incorporated by reference in its entirety.

TECHNICAL FIELD

This application relates to the field of communications technologies, and in particular, to a signal sending method for a terminal device and a terminal device.

BACKGROUND

With development of communications technologies, to increase channel capacity and reliability and improve communication quality, in terms of a new wireless technology, a mobile terminal uses a multi-antenna technology, that is, a multiple input multiple output (Multiple Input Multiple Output, MIMO) technology. For example, a Long Term Evolution (Long Term Evolution, LTE) system, an LTE-advanced (LTE-Advanced) system, and a Worldwide Interoperability for Microwave Access (Worldwide Interoperability for Microwave Access, WiMAX) system all can use the MIMO technology. If end-to-end operating performance of a terminal device with a MIMO function needs to be known, a MIMO over the air (Over the air, OTA) test needs to be performed.

At present, test methods for performing a MIMO OTA test on a terminal device include: a multi-probe anechoic chamber test method, a radiated two-stage test method, a reverberation chamber test method (or a reverberation chamber+ channel emulator test method), and the like.

When the MIMO OTA test is performed on the terminal device, a complex number pattern of each antenna of the terminal device needs to be determined. In existing terminal devices, there is no terminal device capable of measuring a complex number pattern. Consequently, in an existing test method, a MIMO OTA test according to an accurate complex number pattern of each antenna of the terminal device cannot be performed. Further, an obtained measurement result has a relatively large error.

SUMMARY

Embodiments of the present invention provide a signal sending method for a terminal device and a terminal device, to resolve a prior-art problem that there is no terminal device capable of measuring a complex number pattern.

According to an aspect, an embodiment of the present invention provides a signal sending method for a terminal device. The method includes: generating, by the terminal device, a monophonic signal of a specified frequency; and after the monophonic signal is generated, transmitting the monophonic signal by using a specified antenna of the terminal device, where the specified antenna is a receive antenna or a transmit antenna of the terminal device. The specified antenna may be any antenna of multiple receive antennas and multiple transmit antennas of the terminal device, and the specified frequency may be preset by the terminal device or may be set by a user.

The terminal device has a function of transmitting the monophonic signal of the designated frequency by using any specified antenna. Therefore, a measurement system for an antenna complex number pattern of the terminal device can accurately measure a complex number pattern of each antenna of the terminal device in a manner in which the terminal device transmits the monophonic signal of the specified frequency by using each receive antenna or transmit antenna. The measurement system can further obtain an accurate measurement result when a MIMO OTA performance test is performed on the terminal device according to the complex number patterns of all the antennas of the terminal device.

In a possible design, the monophonic signal is a monophonic continuous wave signal of constant amplitude.

The monophonic signal of the specified frequency that is sent by the terminal device is a monophonic continuous wave signal of constant amplitude. This can ensure accuracy of a complex number pattern of each antenna that is obtained by means of measurement subsequently.

In a possible design, before the sending, by the terminal device, the monophonic signal by using the specified antenna, the method further includes:

enabling, by the terminal device, an antenna selection switch of the specified antenna, and disabling antenna selection switches of other receive antenna and transmit antenna different from the specified antenna.

When measuring the complex number pattern of each antenna of the terminal device, the measurement system for the antenna complex number pattern of the terminal device cannot measure complex number patterns of multiple antennas at the same time, and can only sequentially measure the complex number patterns of all the antennas of the terminal device. Therefore, the terminal device may sequentially adjust the specified antenna in the foregoing manner, so that the measurement system for the antenna complex number pattern of the terminal device can measure the complex number pattern of each antenna of the terminal device.

According to another aspect, an embodiment of the present invention further provides a measurement system for an antenna complex number pattern of a terminal device, and the system includes a terminal device and a first signal analyzer, where the terminal device is configured to sequentially transmit a monophonic signal according to a specified sequence by using all of multiple receive antennas of the terminal device; and the first signal analyzer is configured to: when the terminal device transmits the monophonic signal by using any receive antenna, perform the following operations specific to the receive antenna:

separately measuring amplitudes and phases of the monophonic signal on an in-phase I channel and a quadrature Q channel in each measurement direction of a three-dimensional radiation spherical surface, where the monophonic signal is transmitted by the receive antenna; and obtaining a complex number pattern of the receive antenna according to the amplitudes and the phases, obtained by means of measurement specific to the receive antenna, on the I channel and the Q channel in each measurement direction of the three-dimensional radiation spherical surface.

The first signal analyzer can directly and accurately determine the complex number pattern of each receive antenna when the terminal device is in a black box mode. In this way, during a downlink MIMO OTA performance test on the terminal device, a channel emulator may emulate, according to the complex number pattern of each receive antenna, signal transmission scenarios of the terminal device when the terminal device is in different directions, so as to ensure that the base station simulator can finally obtain downlink throughputs of the terminal device when the terminal device is in different directions.

According to the system, the first signal analyzer can directly and accurately determine the complex number pattern of each receive antenna when the terminal device is in the black box mode. In this way, during the downlink MIMO OTA performance test on the terminal device, the channel emulator may emulate, according to the complex number pattern of each receive antenna, the signal transmission scenarios of the terminal device when the terminal device is in different directions, so as to ensure that the base station simulator can finally obtain the downlink throughputs of the terminal device when the terminal device is in different directions.

In a possible design, the first signal analyzer is further configured to:

after obtaining the complex number pattern of each receive antenna, determine, according to complex number patterns of any two of the multiple receive antennas, an antenna envelope correlation coefficient of the two receive antennas.

In this way, the first signal analyzer in the system may further accurately determine the antenna envelope correlation coefficient of the any two receive antennas when the terminal device is in the black box mode.

According to another aspect, an embodiment of the present invention further provides a measurement system for an antenna complex number pattern of a terminal device, and the system includes a terminal device and a third signal analyzer, where the terminal device is configured to sequentially transmit a monophonic signal according to a specified sequence by using all of multiple transmit antennas of the terminal device; and the third signal analyzer is configured to: when the terminal device transmits the monophonic signal by using any transmit antenna, perform the following operations specific to the transmit antenna:

separately measuring amplitudes and phases of the monophonic signal on an in-phase I channel and a quadrature Q channel in each measurement direction of a three-dimensional radiation spherical surface, where the monophonic signal is transmitted by the transmit antenna; and obtaining a complex number pattern of the transmit antenna according to the amplitudes and the phases, obtained by means of measurement specific to the transmit antenna, on the I channel and the Q channel in each measurement direction of the three-dimensional radiation spherical surface.

According to the system, the third signal analyzer can directly and accurately determine the complex number pattern of each transmit antenna when the terminal device is in a black box mode. In this way, during an uplink MIMO OTA performance test on the terminal device, a channel emulator may emulate, according to the complex number pattern of each transmit antenna, signal transmission scenarios of the terminal device when the terminal device is in different directions, so as to ensure that the base station simulator can finally obtain uplink throughputs of the terminal device when the terminal device is in different directions.

In a possible design, the third signal analyzer is further configured to:

after obtaining the complex number pattern of each transmit antenna, determine, according to complex number patterns of any two of the multiple transmit antennas, an antenna envelope correlation coefficient of the two transmit antennas.

In this way, the third signal analyzer in the system may further accurately determine the antenna envelope correlation coefficient of the any two transmit antennas when the terminal device is in the black box mode.

According to another aspect, an embodiment of the present invention further provides a MIMO OTA performance test system, and the system includes a base station simulator, a channel emulator, and a terminal device, where the base station simulator is configured to send multiple streams of downlink test signals to the channel emulator by using multiple downlink ports;

the channel emulator is configured to: perform channel emulation processing on the multiple streams of received downlink test signals according to a complex number pattern of each of multiple receive antennas of a terminal device, a downlink radiation channel inverse matrix, and a specified downlink channel fading model, and send the multiple streams of processed downlink test signals to the terminal device in an anechoic chamber by using multiple downlink antennas in the anechoic chamber; and the terminal device is configured to: receive, by using the multiple receive antennas, the multiple streams of processed downlink test signals sent by the channel emulator, and feed back an acknowledgement message to the base station simulator according to each stream of received processed downlink test signal, where the acknowledgement message that is fed back according to the stream of processed downlink test signal is used to notify the base station simulator whether the terminal device correctly demodulates the processed downlink test signal, where the base station simulator is further configured to determine a downlink throughput of the terminal device according to a quantity of streams of downlink test signals that are sent and a quantity of pieces of acknowledgement information, among received acknowledgement messages, indicating that the terminal device performs correct demodulation.

The base station simulator may send the multiple streams of downlink test signals, and the terminal device may receive, by using the multiple receive antennas, the multiple streams of processed downlink test signals that are sent by the channel emulator by using the multiple downlink antennas, without limiting a quantity of streams of downlink test signals, a quantity of downlink antennas, and a quantity of receive antennas of the terminal device. Therefore, the system can support an a×b downlink MIMO test, where both a and b are positive integers greater than or equal to 2. Apparently, the system can test a throughput of a terminal device having multiple receive channels, and has relatively high applicability.

In a possible design, the system further includes:

a first signal analyzer, configured to determine the complex number pattern of each receive antenna; and the channel emulator is further configured to obtain the complex number pattern of each receive antenna from the first signal analyzer.

In this way, the first signal analyzer in the system can directly and accurately determine the complex number pattern of each receive antenna of the terminal device in the current system. This avoids a problem that inaccurate complex number pattern, determined in another manner, of each receive antenna causes an inaccurate measurement result.

In a possible design, the terminal device is further configured to sequentially transmit a monophonic signal according to a specified sequence by using all of the multiple receive antennas; and the first signal analyzer is specifically configured to perform the following operations specific to each receive antenna:

separately measuring amplitudes and phases of the monophonic signal on an in-phase I channel and a quadrature Q channel in each measurement direction of a three-dimensional radiation spherical surface, where the monophonic signal is transmitted by the receive antenna; and obtaining the complex number pattern of the receive antenna according to the amplitudes and the phases, obtained by means of measurement specific to the receive antenna, on the I channel and the Q channel in each measurement direction of the three-dimensional radiation spherical surface.

The first signal analyzer in the system can directly and accurately determine the complex number pattern of each receive antenna when the terminal device is in a black box mode. In this way, during a downlink MIMO OTA performance test on the terminal device, a channel emulator may emulate, according to the complex number pattern of each receive antenna, signal transmission scenarios of the terminal device when the terminal device is in different directions, so as to ensure that the base station simulator can finally obtain downlink throughputs of the terminal device when the terminal device is in different directions.

In a possible design, the system further includes:

a second signal analyzer, configured to determine a downlink radiation channel matrix of the terminal device; and a first processing device, configured to obtain the downlink radiation channel matrix from the second signal analyzer, and calculate an inverse matrix of the downlink radiation channel matrix to obtain a downlink radiation channel inverse matrix, where the channel emulator is further configured to obtain the downlink radiation channel inverse matrix from the first processing device.

In a possible design, the terminal device is further configured to: determine a smaller value n between a quantity of receive antennas of the terminal device and a quantity of downlink ports of the base station simulator, select n receive antennas from the multiple receive antennas, and sequentially transmit the monophonic signal according to a specified sequence by using all of the n receive antennas; and the second signal analyzer is specifically configured to:

when the terminal device transmits the monophonic signal by using each receive antenna, separately connect to n downlink antennas in the anechoic chamber, and measure a signal received by each of the n downlink antennas;

generate a signal vector specific to each receive antenna according to the signals measured from the n downlink antennas; and generate the downlink radiation channel matrix according to the generated signal vector specific to each of the n receive antennas.

By using the foregoing manner, the second signal analyzer can directly and accurately determine the downlink radiation channel matrix of the terminal device, and further obtain the accurate downlink radiation channel inverse matrix. In this way, during the downlink MIMO OTA performance test on the terminal device, the channel emulator may perform channel emulation processing on the downlink test signals according to the accurate downlink radiation channel inverse matrix, and further obtain an accurate measurement result.

In a possible design, the first signal analyzer is further configured to:

after determining the complex number pattern of each of the multiple receive antennas of the terminal device, determine, according to complex number patterns of any two of the multiple receive antennas, an antenna envelope correlation coefficient of the two receive antennas.

In this way, in the system, the antenna envelope correlation coefficient of the any two receive antennas of the terminal device in the black box mode can be further determined accurately.

According to another aspect, an embodiment of the present invention further provides a MIMO OTA performance test system, and the system includes a terminal device, a channel emulator, and a base station simulator, where the terminal device in an anechoic chamber, configured to transmit multiple streams of uplink test signals by using multiple transmit antennas of the terminal device, and transmit the multiple streams of uplink test signals to the channel emulator by using multiple uplink antennas in the anechoic chamber;

the channel emulator, configured to perform channel emulation processing on the multiple streams of uplink test signals according to a complex number pattern of each of the multiple transmit antennas of the terminal device, the uplink radiation channel inverse matrix, and a specified uplink channel fading model, and send the multiple streams of processed uplink test signals to the base station simulator; and the base station simulator, configured to receive, by using multiple uplink ports, the multiple streams of processed uplink test signals that are sent by the channel emulator, and determine an uplink throughput of the terminal device according to a quantity of streams of uplink test signals that are sent by the terminal device and a quantity of streams of processed uplink test signals that are received by the base station simulator.

According to the system, the uplink throughput of the terminal device can be accurately measured, so as to accurately obtain uplink operating performance of the terminal device.

In a possible design, the system further includes:

a third signal analyzer, configured to determine the complex number pattern of each transmit antenna; and the channel emulator is further configured to obtain the complex number pattern of each transmit antenna from the third signal analyzer.

In this way, the third signal analyzer in the system can directly determine the complex number pattern of each transmit antenna of the terminal device in the current system. This avoids a problem that inaccurate complex number pattern, determined in another manner, of each transmit antenna causes an inaccurate measurement result.

In a possible design, the terminal device is further configured to sequentially transmit a monophonic signal according to a specified sequence by using all of the multiple transmit antennas; and the third signal analyzer is specifically configured to perform the following operations specific to each transmit antenna:

separately measuring amplitudes and phases of the monophonic signal on an in-phase I channel and a quadrature Q channel in each measurement direction of a three-dimensional radiation spherical surface, where the monophonic signal is transmitted by the transmit antenna; and obtaining the complex number pattern of the transmit antenna according to the amplitudes and the phases, obtained by means of measurement specific to the receive antenna, on the I channel and the Q channel in each measurement direction of the three-dimensional radiation spherical surface.

The third signal analyzer in the system can directly and accurately determine the complex number pattern of each transmit antenna when the terminal device is in a black box mode. In this way, during an uplink MIMO OTA performance test on the terminal device, the channel emulator may emulate, according to the complex number pattern of each transmit antenna, signal transmission scenarios of the terminal device when the terminal device is in different directions, so as to ensure that the base station simulator can finally obtain uplink throughputs of the terminal device when the terminal device is in different directions.

In a possible design, the system further includes:

a fourth signal analyzer, configured to determine an uplink radiation channel matrix of the terminal device; and a second processing device, configured to obtain the uplink radiation channel matrix from the fourth signal analyzer, and calculate an inverse matrix of the uplink radiation channel matrix to obtain an uplink radiation channel inverse matrix, where the channel emulator is further configured to obtain the uplink radiation channel inverse matrix from the second processing device.

In a possible design, the terminal device is further configured to: determine a smaller value m between a quantity of transmit antennas of the terminal device and a quantity of uplink ports of the base station simulator, select m transmit antennas from the multiple transmit antennas, and sequentially transmit the monophonic signal according to the specified sequence by using all of the m transmit antennas; and the fourth signal analyzer is specifically configured to:

when the terminal device transmits the monophonic signal by using each transmit antenna, separately connect to m uplink antennas in the anechoic chamber, and measure a signal received by each of the m uplink antennas;

generate a signal vector specific to each transmit antenna according to the signals measured from the m uplink antennas; and generate the uplink radiation channel matrix according to the generated signal vector specific to each of the m transmit antennas.

The fourth signal analyzer in the system can directly and accurately determine the uplink radiation channel matrix of the terminal device, and further obtain the accurate uplink radiation channel inverse matrix. In this way, during the uplink MIMO OTA performance test on the terminal device, the channel emulator may perform channel emulation processing on the uplink test signals according to the accurate uplink radiation channel inverse matrix, and further obtain an accurate measurement result.

In a possible design, the third signal analyzer is further configured to:

after determining the complex number pattern of each of the multiple transmit antennas of the terminal device, determine, according to complex number patterns of any two of the multiple transmit antennas, an antenna envelope correlation coefficient of the two transmit antennas.

In this way, in the system, the antenna envelope correlation coefficient of the any two transmit antennas of the terminal device in the black box mode can be further determined accurately.

According to another aspect, an embodiment of the present invention further provides a terminal device, and the terminal device has a function of implementing a behavior of the terminal device in the foregoing method embodiment. The function may be implemented by using hardware, or may be implemented by executing corresponding software by using hardware. The hardware or software includes one or more modules corresponding to the foregoing function.

In a possible design, a structure of the terminal device includes a generation unit and a transmission unit. These units can execute corresponding functions in the foregoing method example. For details, refer to detailed descriptions in the method example. Details are not repeated herein.

In a possible design, a structure of the terminal device includes a signal generator, a processor, a bus, a memory, and multiple antennas (multiple receive antennas and multiple transmit antennas). The signal generator is configured to generate a monophonic signal of a specified frequency, the multiple antennas are configured to transmit the monophonic signal, and the processor is configured to support the terminal device in executing the corresponding functions in the foregoing method. The memory is coupled to the processor, and stores a necessary program instruction and data of the terminal device.

According to another aspect, an embodiment of the present invention further provides a measurement method for an antenna complex number pattern of a terminal device. The method is used to measure a complex number pattern of each receive antenna of the terminal device. A device used in the method may be a corresponding device in the example of the measurement system for the complex number pattern of each receive antenna of the terminal device. For a specific procedure, refer to detailed descriptions of the foregoing system. Details are not repeated herein.

According to another aspect, an embodiment of the present invention further provides a measurement method for an antenna complex number pattern of a terminal device. The method is used to measure a complex number pattern of each transmit antenna of the terminal device. A device used in the method may be a corresponding device in the example of the measurement system for the complex number pattern of each transmit antenna of the terminal device. For a specific procedure, refer to detailed descriptions of the foregoing system. Details are not repeated herein.

According to another aspect, an embodiment of the present invention further provides a MIMO OTA performance test method. The method is used to test a downlink throughput of a terminal device. A device used in the method may be a corresponding device in the example of the measurement system for the downlink throughput of the terminal device. For a specific procedure, refer to detailed descriptions of the foregoing system. Details are not repeated herein.

According to another aspect, an embodiment of the present invention further provides a MIMO OTA performance test method. The method is used to test an uplink throughput of a terminal device. A device used in the method may be a corresponding device in the example of the measurement system for the uplink throughput of the terminal device. For a specific procedure, refer to detailed descriptions of the foregoing system. Details are not repeated herein.

In the embodiments of the present invention, the terminal device has a function of transmitting the monophonic signal of the designated frequency by using any specified antenna. Therefore, the measurement system for the antenna complex number pattern of the terminal device can accurately measure a complex number pattern of each antenna of the terminal device in a manner in which the terminal device transmits the monophonic signal of the specified frequency by using each receive antenna or transmit antenna. The measurement system can further obtain an accurate measurement result when a MIMO OTA performance test is performed on the terminal device according to the complex number patterns of all the antennas of the terminal device.

BRIEF DESCRIPTION OF DRAWINGS

FIG. 9 is a flowchart of a measurement method for an antenna complex number pattern of a terminal device according to an embodiment of the present invention;

FIG. 10 is a flowchart of another measurement method for an antenna complex number pattern of a terminal device according to an embodiment of the present invention;

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The embodiments of the present invention provide a signal sending method for a terminal device and a terminal device, to resolve a prior-art problem that there is no terminal device capable of measuring a complex number pattern. The method and the apparatus are based on a same inventive idea. Because principles of resolving problems of the method and the apparatus are similar, mutual reference may be made to implementations of the apparatus and the method, and repeated content is not repeated.

According to the technical solutions of the present invention, the terminal device can generate a monophonic signal of a specified frequency, and can transmit the monophonic signal by using a specified receive antenna or transmit antenna of the terminal device. The terminal device has a function of transmitting the monophonic signal of the designated frequency by using any specified antenna. Therefore, a measurement system for an antenna complex number pattern of the terminal device can accurately measure a complex number pattern of each antenna of the terminal device in a manner in which the terminal device transmits the monophonic signal of the specified frequency by using each receive antenna or transmit antenna. The measurement system can further obtain an accurate measurement result when a MIMO OTA performance test is performed on the terminal device according to the complex number patterns of all the antennas of the terminal device.

To make the objectives, technical solutions, and advantages of the present invention clearer, the following describes the technical solutions of the embodiments of the present invention in detail with reference to the accompanying drawings.

Figure 1:
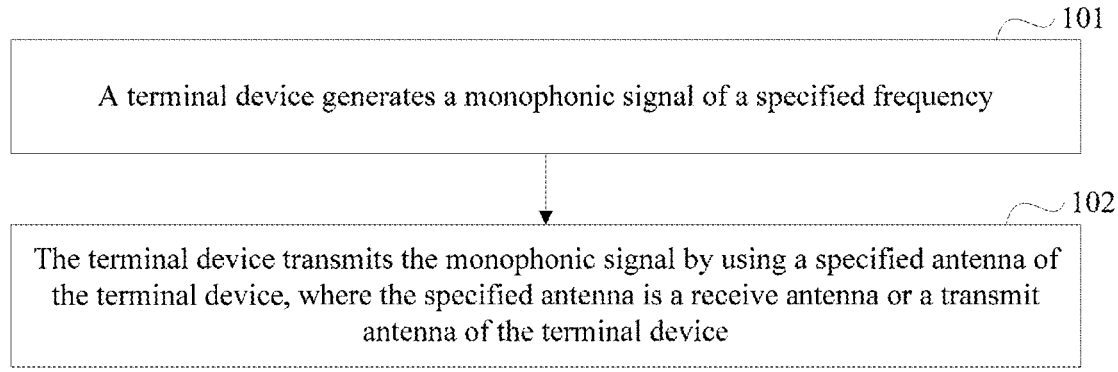
FIG. 1 is a flowchart of a signal sending method for a terminal device according to an embodiment of the present invention.

An embodiment of the present invention provides a signal sending method for a terminal device. The terminal device can measure a complex number pattern of each antenna. Referring to FIG. 1, a procedure of the method is as follows:

Step 101: The terminal device generates a monophonic signal of a specified frequency.

The specified frequency may be preset by the terminal device or set by a user. This is not limited in the present invention.

In some embodiments, the monophonic signal is a monophonic continuous wave signal of constant amplitude.

The monophonic signal of the specified frequency that is sent by the terminal device is a monophonic continuous wave signal of constant amplitude. This can ensure accuracy of a complex number pattern of each antenna that is obtained by means of measurement subsequently.

Step 102: The terminal device transmits the monophonic signal by using a specified antenna of the terminal device, where the specified antenna is a receive antenna or a transmit antenna of the terminal device.

The specified antenna may be any antenna of multiple receive antennas and multiple transmit antennas of the terminal device.

The terminal device may control the specified antenna to transmit the monophonic signal. This can ensure that a measurement system for an antenna complex number pattern of the terminal device can measure a complex number pattern of the specified antenna.

When measuring the complex number pattern of each antenna of the terminal device, the measurement system for the antenna complex number pattern of the terminal device cannot measure complex number patterns of multiple antennas at the same time, and can only sequentially measure the complex number patterns of all the antennas of the terminal device. Therefore, the terminal device may sequentially adjust the specified antenna, so that the measurement system for the antenna complex number pattern of the terminal device can measure the complex number pattern of each antenna of the terminal device.

In some embodiments, the terminal device may control the specified antenna (a receive antenna or a transmit antenna) of the terminal device, to connect the antenna to a transmit channel, so as to transmit the monophonic signal of the specified frequency.

In some embodiments, the terminal device may control, by using an antenna selection switch of each antenna, the receive antenna whether to transmit the monophonic signal of the designated frequency. That is, before the terminal device sends the monophonic signal by using the specified antenna, the terminal device enables an antenna selection switch of the specified antenna, and disables antenna selection switches of other receive antenna and transmit antenna different from the specified antenna.

According to the signal sending method for the terminal device provided in this embodiment of the present invention, the terminal device can generate the monophonic signal of the specified frequency, and can transmit the monophonic signal by using the specified receive antenna or transmit antenna of the terminal device. The terminal device has a function of transmitting the monophonic signal of the designated frequency by using any specified antenna. Therefore, the measurement system for the antenna complex number pattern of the terminal device can accurately measure a complex number pattern of each antenna of the terminal device in a manner in which the terminal device transmits the monophonic signal of the specified frequency by using each receive antenna or transmit antenna. The measurement system can further obtain an accurate measurement result when a MIMO OTA performance test is performed on the terminal device according to the complex number patterns of all the antennas of the terminal device.

In an existing multi-probe anechoic chamber test method, a complex number pattern of each receive antenna of the terminal device cannot be directly obtained by means of measurement. In a radiated two-stage test method, a complex number pattern of each receive antenna of the terminal device can be obtained only by using data reported by the terminal device. Therefore, in the foregoing test methods, a MIMO OTA test according to an accurate complex number pattern of each antenna of the terminal device cannot be performed, and further, an obtained measurement result has a relatively large error.

Figure 2:
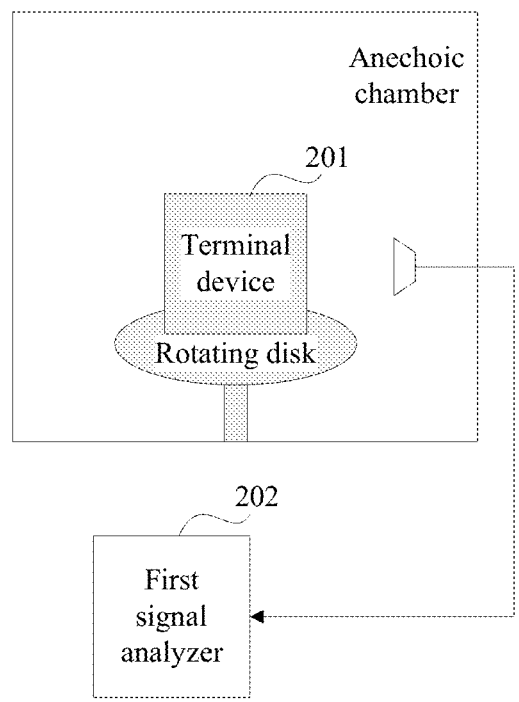
FIG. 2 is an architecture diagram of a measurement system for an antenna complex number pattern of a terminal device according to an embodiment of the present invention.

An embodiment of the present invention provides a measurement system for an antenna complex number pattern of a terminal device. The system is configured to measure a complex number pattern of each receive antenna of the terminal device. Referring to FIG. 2, a system architecture of the system includes a terminal device 201 and a first signal analyzer 202. The terminal device 201 has a function of implementing the signal sending method for the terminal device shown in FIG. 1. In addition, an anechoic chamber in which the terminal device 201 is located may be a general-purpose single input single output (Single Input Single Output, SISO) OTA anechoic chamber, an anechoic chamber using a great circle cut test method, or an anechoic chamber using a conical cut test method. The anechoic chamber used in this embodiment of the present invention is the general-purpose SISO OTA anechoic chamber. The first signal analyzer 202 may be a multi-input network analyzer.

The terminal device 201 is configured to sequentially transmit a monophonic signal according to a specified sequence by using all of multiple receive antennas of the terminal device 201.

The first signal analyzer 202 is configured to perform the following operations specific to each receive antenna:

separately measuring amplitudes and phases of the monophonic signal on an in-phase (In-phase, I) channel and a quadrature (Quadrature, Q) channel in each measurement direction of a three-dimensional radiation spherical surface, where the monophonic signal is transmitted by the receive antenna; and obtaining the complex number pattern of the receive antenna according to the amplitudes and the phases, obtained by means of measurement specific to the receive antenna, on the I channel and the Q channel in each measurement direction of the three-dimensional radiation spherical surface.

When the first signal analyzer 202 determines the complex number pattern of each receive antenna, the terminal device 201 needs to lock a specified frequency. That is, frequencies of monophonic signals transmitted by the terminal device 201 by using all the receive antennas are the same. The terminal device 201 has a function of transmitting the monophonic signal of the specified frequency. In addition, the terminal device 201 may control any receive antenna, so that the receive antenna is connected to a transmit channel, to transmit the monophonic signal of the designated frequency. In some embodiments, the terminal device 201 may control, by using an antenna selection switch of the receive antenna, the receive antenna whether to transmit the monophonic signal of the designated frequency. The monophonic signal is a monophonic continuous wave signal of constant amplitude.

In the system provided in this embodiment of the present invention, a rotating disk in the anechoic chamber is used to control a direction of the terminal device 201. The first signal analyzer 202 measures, by using a dual-polarized antenna in the anechoic chamber, amplitudes and phases on the I channel and the Q channel in a measurement direction of the monophonic signal transmitted by the receive antenna. A position of the dual-polarized antenna is fixed. Therefore, the terminal device 201 can adjust the measurement direction by rotating on the rotating disk.

In some embodiments, amplitudes and phases in each measurement direction of the three-dimensional radiation spherical surface may be represented by using representative amplitudes and phases in multiple measurement directions. The measurement direction may be represented by using a first included angle $\theta$ and a second included angle $\varphi$. The first included angle is a vertical included angle between a vector in the measurement direction and a horizontal plane. The first included angle is within a range of $[-90°, 90°]$. The second included angle is an included angle between a projection, on the horizontal plane, of the vector and a reference direction. The second included angle is within a range of $[0°, 360°)$.

In some embodiments, that the first signal analyzer 202 separately measures, for the first receive antenna, amplitudes and phases, on the I channel and the Q channel in each measurement direction of the three-dimensional radiation spherical surface, of the monophonic signal transmitted by the first receive antenna includes:

skipping adjusting the rotating disk; determining that a current measurement direction is an initial measurement direction $(\theta_0, \phi_0)$, where $\theta_0$ is the first included angle, and $\phi_0$ is the second included angle; and measuring, by the first signal analyzer 202 by using a dual-polarized antenna, an amplitude and a phase, on the I channel in the measurement direction $(\theta_0, \phi_0)$, of the monophonic signal transmitted by the first receive antenna, to obtain a complex number test result $E_{1I}(\theta_0, \phi_0)$, and measuring, an amplitude and a phase, on the Q channel in the measurement direction $(\theta_0, \phi_0)$, of the monophonic signal transmitted by the receive antenna, to obtain a complex number test result $E_{1Q}(\theta_0, \phi_0)$;

controlling the direction of the terminal device 201 by adjusting the rotating disk, to make θ in the measurement direction fixed; adjusting φ according to a specified second step Δφ until a value for adjusting φ traverses a value range of φ, where the value range of φ is [φ$_{mod}$, φ$_{mod}$+Δφ, φ$_{mod}$+2Δφ, . . . , φ$_{mod}$+PΔφ], φ$_{mod}$=φ$_0$%(Δφ), and $$p = \left[ \frac{360°}{\Delta \phi} \right];$$

and after each measurement direction adjustment, measuring, by the first signal analyzer 202 by using the dual-polarized antenna, an amplitude and a phase, on the I channel in an adjusted measurement direction, of the monophonic signal transmitted by the first receive antenna, to obtain a complex number test result, and measuring, an amplitude and a phase, on the Q channel in the adjusted measurement direction, of the monophonic signal transmitted by the first receive antenna, to obtain a complex number test result;

retaining φ=φ$_0$+nΔφ in a last measurement direction unchanged by adjusting the rotating disk; adjusting θ one time according to a specified first step Δθ, to make θ=θ$_0$+Δθ; measuring, by the first signal analyzer 202 by using the dual-polarized antenna, amplitudes and phases, on the I channel and the Q channel in a measurement direction (θ$_0$+Δθ, φ$_0$+pΔφ), of the monophonic signal transmitted by the first receive antenna, to obtain a complex number test result; keeping θ=θ$_0$+Δθ in the measurement direction fixed by continuing adjusting the rotating disk, and adjusting φ according to the specified second step until the value for adjusting φ traverses the range value of φ, where the value range of φ is [φ$_{mod}$, φ$_{mod}$+Δφ, φ$_{mod}$+2Δφ, . . . , φ$_{mod}$+pΔφ], φ$_{mod}$=φ$_0$%(Δφ), and $$p = \left[ \frac{360°}{\Delta \phi} \right];$$

and after each measurement direction adjustment, measuring, by the first signal analyzer 202 by using the dual-polarized antenna, amplitudes and phases, on the I channel and the Q channel in an adjusted measurement direction, of the monophonic signal transmitted by the first receive antenna, to obtain a complex number measurement result; and repetition goes on in such a manner until the value for adjusting θ traverses the value range of θ, where a value range of θ is [θ$_{mod}$, θ$_{mod}$+Δθ, θ$_{mod}$+2Δθ, . . . , θ$_{mod}$+pΔθ], θ$_{mod}$=θ$_0$%(Δθ), and $$q = \left[ \frac{180°}{\Delta \theta} \right].$$

The first signal analyzer 202 measures, in the foregoing manner, the amplitudes and the phases, in each measurement direction of the three-dimensional radiation spherical surface, of the monophonic signal transmitted by the first receive antenna, and uses a measurement result as a complex number pattern P$_1$(θ, φ) of the first receive antenna.

Still using the foregoing method, the first signal analyzer 202 may determine a complex number pattern P$_2$ (θ, φ) of the second receive antenna, and a complex number pattern of each subsequent receive antenna.

In an existing multi-probe anechoic chamber test method, a complex number pattern of each receive antenna of the terminal device cannot be directly obtained by means of measurement. In a radiated two-stage test method, a complex number pattern of each receive antenna of the terminal device can be obtained only by using data reported by the terminal device. In the system provided in this embodiment of the present invention, the first signal analyzer 202 can directly and accurately determine the complex number pattern of each receive antenna when the terminal device 201 is in a black box mode. In this way, during a MIMO OTA performance test on the terminal device 201, a channel emulator may emulate, according to the complex number pattern of each receive antenna, signal transmission scenarios of the terminal device when the terminal device is in different directions, so as to ensure that the base station simulator can finally obtain throughputs of the terminal device when the terminal device is in different directions.

In some embodiments, the first signal analyzer 202 is further configured to: after obtaining the complex number pattern of each receive antenna, determine, according to complex number patterns of any two of the multiple receive antennas, an antenna envelope correlation coefficient of the two receive antennas.

In some embodiments, the first signal analyzer 202 may determine an antenna envelope correlation coefficient $$\rho_e = \frac{|\varpi_1|^2}{\varpi_2 \Box \varpi_3}$$

of the first receive antenna and the second receive antenna according to the following formulas:

$$\overline{\omega}_1 = \oiint \{ XPR \Box E_{1I}(\theta,\phi) \Box E_{2I'}(\theta,\phi) \Box P_I(\theta,\phi) + E_{1Q}(\theta,\phi) \Box E_{2Q'}(\theta,\phi) \Box P_Q(\theta,\phi) \} d\Omega;$$

$$\overline{\omega}_2 = \oiint \{ XPR \Box E_{1I}(\theta,\phi) \Box E_{2I'}(\theta,\phi) \Box P_I(\theta,\phi) + E_{2Q}(\theta,\phi) \Box E_{2Q'}(\theta,\phi) \Box P_Q(\theta,\phi) \} d\Omega;$$

and $$\overline{\omega}_3 = \oiint \{ XPR \Box E_{2I}(\theta,\phi) \Box E_{2I'}(\theta,\phi) \Box P_I(\theta,\phi) + E_{2Q}(\theta,\phi) \Box E_{2Q'}(\theta,\phi) \Box P_Q(\theta,\phi) \} d\Omega.$$

In the foregoing formulas, E$_{1I}$(θ, φ) is a complex number test result of the first receive antenna on the I channel in each measurement direction; E$_{2I}$' (θ, φ) is a complex conjugate of E$_{2I}$(θ, φ), and E$_{2I}$(θ, φ) is a complex number test result of the second receive antenna on the I channel in each measurement direction; E$_{1Q}$(θ,φ) is a complex number test result of the first receive antenna on the Q channel in each measurement direction; E$_{2Q}$' (θ, φ) is a complex conjugate of E$_{2Q}$(θ, φ), and E$_{2Q}$(θ, φ) is a complex text result of the second receive antenna on the Q channel in each measurement direction; P$_I$(θ, φ) is a complex number test result of two receive antennas on the I channel in each measurement direction; P$_Q$ (θ, φ) is a complex number test result of two receive antennas on the Q channel in each measurement direction; XPR is a preset cross-polarization ratio of receive antennas on the I channel and the Q channel; E$_{1I}$'(θ, φ) is a complex conjugate of E$_{1I}$(θφ); and E$_{1Q}$'(θ, φ) is a complex conjugate of E$_{1Q}$(θ, φ).

When determining the complex number pattern of each receive antenna, the first signal analyzer 202 adjusts θ according to the first step Δθ, and adjusts φ according to the second step. When adjusting the measurement direction finally, the first signal analyzer 104 may still determine the antenna envelope correlation coefficient $$\rho_e = \frac{|\varpi_1|^2}{\varpi_2 \square \varpi_3}$$

of the first receive antenna and the second receive antenna according to the following formulas:

$$\varpi_1 = \sum_{i=1}^{p\Delta\phi} \sum_{j=0}^{q\Delta\theta} \{XPR \square E_{1I}(\theta,\phi) \square E'_{2I}(\theta,\phi) \square P_I(\theta,\phi) +$$

$$E_{1Q}(\theta,\phi) \square E'_{2Q}(\theta,\phi) \square P_Q(\theta,\phi)\} \square \sin(i) \square \Delta\theta \square \Delta\phi;$$

$$\varpi_2 = \sum_{i=1}^{p\Delta\phi} \sum_{j=0}^{q\Delta\theta} \{XPR \square E_{1I}(\theta,\phi) \square E'_{1I}(\theta,\phi) \square P_I(\theta,\phi) +$$

$$E_{1Q}(\theta,\phi) \square E'_{1Q}(\theta,\phi) \square P_Q(\theta,\phi)\} \square \sin(i) \square \Delta\theta \square \Delta\phi;$$

and $$\varpi_3 = \sum_{i=1}^{p\Delta\phi} \sum_{j=0}^{q\Delta\theta} \{XPR \square E_{2I}(\theta,\phi) \square E'_{2I}(\theta,\phi) \square P_I(\theta,\phi) +$$

$$E_{2Q}(\theta,\phi) \square E'_{2Q}(\theta,\phi) \square P_Q(\theta,\phi)\} \square \sin(i) \square \Delta\theta \square \Delta\phi.$$

A meaning of each parameter in this group of formulas is the same as a meaning of a corresponding parameter in the foregoing group of formulas, the parameters may be used for cross reference, and details are not repeated herein.

$$p = \left[\frac{360°}{\Delta\phi}\right] \text{ and } q = \left[\frac{180°}{\Delta\theta}\right].$$

In the system provided in this embodiment of the present invention, according to the foregoing method, after determining the complex number pattern of each of the multiple receive antennas of the terminal device 201, the first signal analyzer 202 may determine the antenna envelope correlation coefficient of the any two receive antennas according to the complex number patterns of the two of the multiple receive antennas.

In the measurement system for the antenna complex number pattern of the terminal device provided in this embodiment of the present invention, the first signal analyzer can directly and accurately determine the complex number pattern of each receive antenna when the terminal device is in the black box mode. In this way, during a downlink MIMO OTA performance test on the terminal device, the channel emulator may emulate, according to the complex number pattern of each receive antenna, signal transmission scenarios of the terminal device when the terminal device is in different directions, so as to ensure that the base station simulator can finally obtain downlink throughputs of the terminal device when the terminal device is in different directions. Further, in the system, the antenna envelope correlation coefficient of the any two receive antennas of the terminal device in the black box mode can be further determined accurately.

Figure 3:
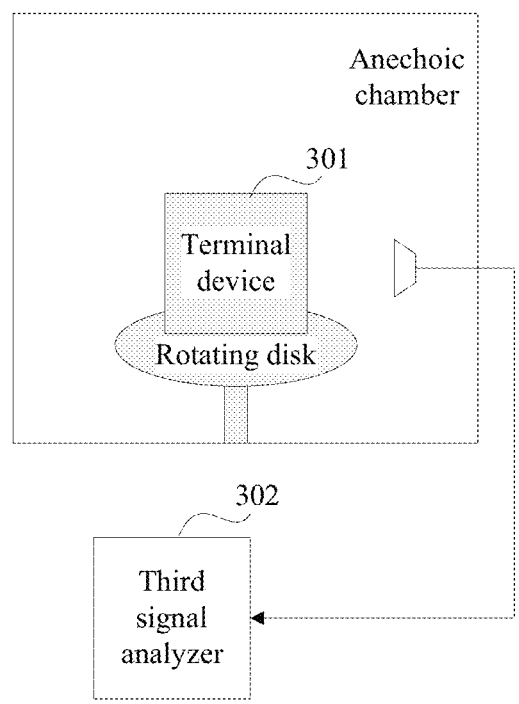
FIG. 3 is an architecture diagram of another measurement system for an antenna complex number pattern of a terminal device according to an embodiment of the present invention.

In all various existing MIMO OTA test methods, a complex number pattern of each transmit antenna of a terminal device cannot be measured. An embodiment of the present invention provides another measurement system for an antenna complex number pattern of a terminal device. The system is configured to measure a complex number pattern of each transmit antenna of the terminal device. Referring to FIG. 3, a system architecture of the system includes a terminal device 301 and a third signal analyzer 302. The terminal device 301 has a function of implementing the signal sending method for the terminal device shown in FIG. 1. In addition, an anechoic chamber in which the terminal device 301 is located may be a SISO OTA anechoic chamber, an anechoic chamber using a great circle cut test method, or an anechoic chamber using a conical cut test method. The anechoic chamber used in this embodiment of the present invention is the general-purpose SISO OTA anechoic chamber. The third signal analyzer 302 may alternatively be a multi-input network analyzer.

The terminal device 301 is configured to sequentially transmit a monophonic signal according to a specified sequence by using all of multiple transmit antennas of the terminal device.

The third signal analyzer 302 is configured to perform the following operations specific to each transmit antenna:

separately measuring amplitudes and phases of the monophonic signal on an I channel and a Q channel in each measurement direction of a three-dimensional radiation spherical surface, where the monophonic signal is transmitted by the transmit antenna; and obtaining a complex number pattern of the transmit antenna according to the amplitudes and the phases, obtained by means of measurement specific to the transmit antenna, on the I channel and the Q channel in each measurement direction of the three-dimensional radiation spherical surface.

Apparently, the terminal device 301 may control the transmit antenna by using an antenna selection switch, so that the transmit antenna may also transmit a monophonic signal of a specified frequency and constant amplitude. The monophonic signal is a monophonic continuous wave signal.

A function of the third signal analyzer 302, a test procedure, and a measurement direction adjustment manner that are used when the third signal analyzer 302 measures the complex number pattern of each transmit antenna are respectively the same as those used when the first signal analyzer 202 measures the complex number pattern of each receive antenna. Details are not repeated herein.

In some embodiments, the third signal analyzer 302 is further configured to:

after obtaining the complex number pattern of each transmit antenna, determine, according to complex number patterns of any two of the multiple transmit antennas, an antenna envelope correlation coefficient of the two transmit antennas.

A method and a formula that are used when the third signal analyzer 302 determines the antenna envelope correlation coefficient of the any two transmit antennas are respectively the same as those used when the first signal analyzer 202 determines the antenna envelope correlation coefficient of the any two transmit antennas. Details are not repeated herein.

In the measurement system for the antenna complex number pattern of the terminal device provided in this embodiment of the present invention, the third signal analyzer can directly and accurately determine the complex number pattern of each transmit antenna when the terminal device is in a black box mode. In this way, during an uplink MIMO OTA performance test on the terminal device, a channel emulator may emulate, according to the complex number pattern of each transmit antenna, signal transmission scenarios of the terminal device when the terminal device is in different directions, so as to ensure that the base station simulator can finally obtain uplink throughputs of the terminal device when the terminal device is in different directions. Further, in the system, the antenna envelope correlation coefficient of the any two transmit antennas of the terminal device in the black box mode can be further determined accurately.

At present, an existing test method for performing a MIMO OTA test on a terminal device supports only a 2×2 downlink MIMO test, and cannot test a downlink throughput of a terminal device that has more than two receive channels. Therefore, the existing test method cannot be used to test a throughput of a terminal device having multiple receive channels, and has relatively low applicability.

Figure 4:
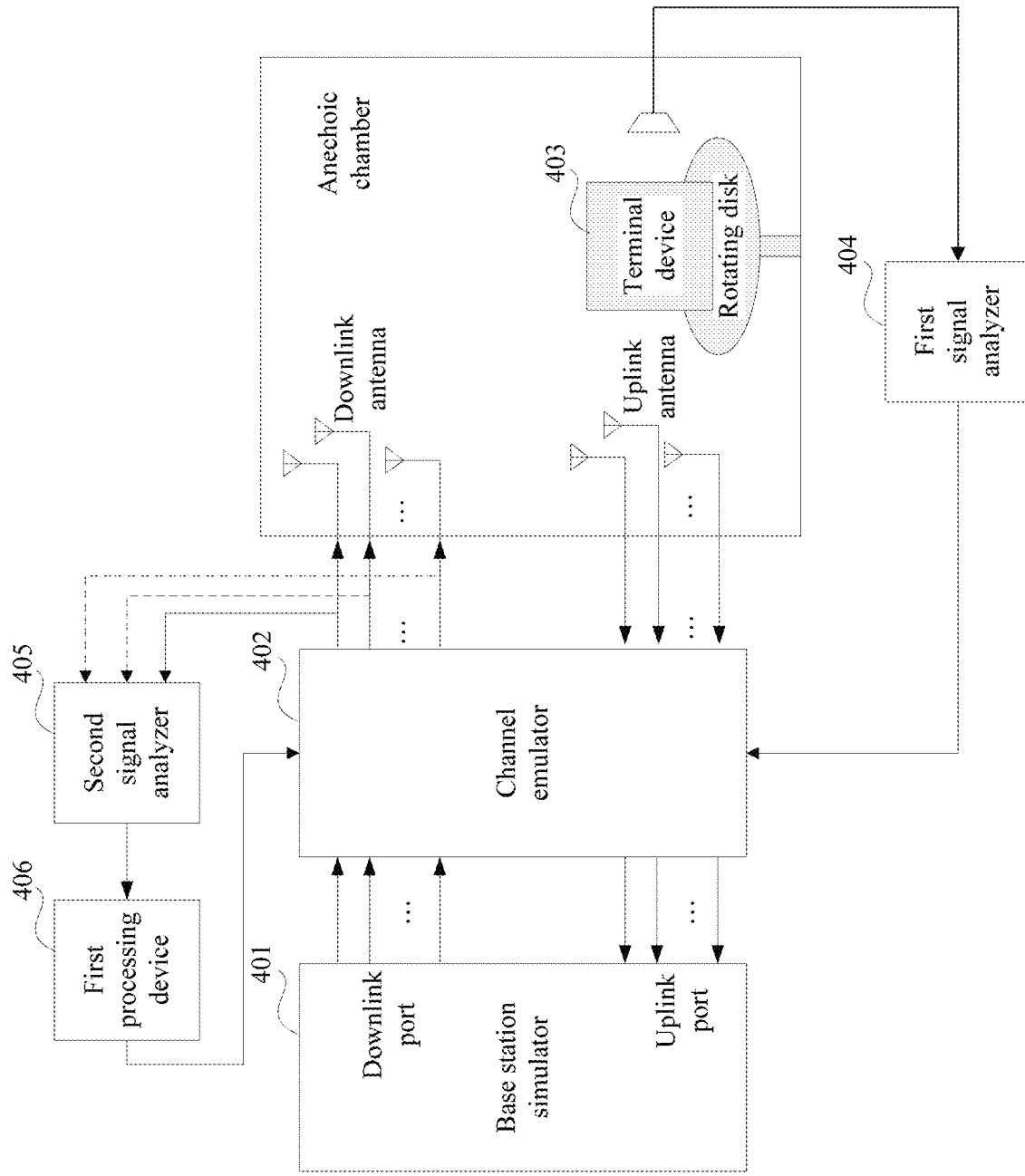
FIG. 4 is an architecture diagram of a MIMO OTA performance test system according to an embodiment of the present invention.

To resolve a problem that the existing test method for performing the MIMO OTA test on the terminal device cannot be used to test a throughput of a terminal device having multiple receive channels and has relatively low applicability, an embodiment of the present invention further provides a MIMO OTA performance test system. Referring to FIG. 4, a system architecture of the system includes a base station simulator 401, a channel emulator 402, and a terminal device 403 in an anechoic chamber. The anechoic chamber in which the terminal device 403 is located may be a general-purpose single input single output (Single Input Single Output, SISO) OTA anechoic chamber, an anechoic chamber using a great circle cut test method, or an anechoic chamber using a conical cut test method. The anechoic chamber used in this embodiment of the present invention is the general-purpose SISO OTA anechoic chamber, and only an appropriate quantity of test antennas (downlink antennas) needs to be added. Therefore, costs are reduced.

When the system architecture is used to perform a downlink MIMO OTA performance test on the terminal device, the base station simulator 401 is configured to send multiple streams of downlink test signals to the channel emulator 402 by using multiple downlink ports.

The channel emulator 402 is configured to: perform channel emulation processing on the multiple streams of received downlink test signals according to a complex number pattern of each of multiple receive antennas of the terminal device 403, a downlink radiation channel inverse matrix, and a specified downlink channel fading model, and send the multiple streams of processed downlink test signals to the terminal device 403 in the anechoic chamber by using multiple downlink antennas in the anechoic chamber.

The terminal device 403 is configured to: receive, by using the multiple receive antennas, the multiple streams of processed downlink test signals sent by the channel emulator, and feed back an acknowledgement message to the base station simulator 401 according to each stream of received processed downlink test signal, where the acknowledgement message that is fed back according to the stream of processed downlink test signal is used to notify the base station simulator 401 whether the terminal device 403 correctly demodulates the processed downlink test signal.

The base station simulator 401 is further configured to determine a downlink throughput of the terminal device 403 according to a quantity of streams of downlink test signals that are sent and a quantity of pieces of acknowledgement information, among received acknowledgement messages, indicating that the terminal device 403 performs correct demodulation.

The specified downlink channel fading model in the channel emulator 402 may be a spatial channel model extended (Spatial Channel Model Extended, SCME) Umi, an SCME Uma, or another channel fading model.

That the base station simulator 401 determines a downlink throughput of the terminal device 403 according to a quantity of streams of downlink test signals that are sent and a quantity of pieces of acknowledgement information, among received acknowledgement messages, indicating that the terminal device 403 performs correct demodulation includes:

using, by the base station simulator 401, a quotient obtained by dividing the quantity of pieces of acknowledgement information indicating correct demodulation is performed from the quantity of streams of the downlink test signals that are sent, as the downlink throughput of the terminal device 403.

The acknowledgement message that is fed back according to the stream of processed downlink test signal is usually an acknowledgement message (ACKnowledge, ACK) or a negative acknowledgement message (Negative ACKnowledge, NACK). When the acknowledgement message is an ACK, the acknowledgement message is used to notify the base station simulator 401 that the terminal device 403 correctly demodulates the processed downlink test signal. When the acknowledgement message is a NACK, the acknowledgement message is used to notify the base station simulator 401 that the terminal device 403 does not correctly demodulate the processed downlink test signal.

In some embodiments, the system further includes:
a first signal analyzer 404, configured to determine the complex number pattern of each receive antenna; and
the channel emulator 402 is further configured to obtain the complex number pattern of each receive antenna from the first signal analyzer 404.

When the first signal analyzer 404 determines the complex number pattern of each receive antenna,
the terminal device 403 is further configured to sequentially transmit a monophonic signal according to a specified sequence by using all of the multiple receive antennas; and
the first signal analyzer 404 is specifically configured to perform the following operations specific to each receive antenna:

separately measuring amplitudes and phases of the monophonic signal on an I channel and a Q channel in each measurement direction of a three-dimensional radiation spherical surface, where the monophonic signal is transmitted by the receive antenna; and obtaining the complex number pattern of the receive antenna according to the amplitudes and the phases, obtained by means of measurement specific to the receive antenna, on the I channel and the Q channel in each measurement direction of the three-dimensional radiation spherical surface.

Apparently, when the first signal analyzer 404 in the system may determine the complex number pattern of each receive antenna, the terminal device 403 has a function of implementing the signal sending method for the terminal device shown in FIG. 1, that is, a function of transmitting a monophonic signal of a designated frequency by using any specified antenna.

A function of the first signal analyzer 404, a test procedure, and a measurement direction adjustment manner that are used when the first signal analyzer 404 measures the complex number pattern of each receive antenna are respectively the same as those used when the first signal analyzer 202 in the measurement system for the antenna complex number pattern of the terminal device shown in FIG. 2 measures the complex number pattern of each receive antenna. Details are not repeated herein.

According to the foregoing manner, the first signal analyzer can directly and accurately determine the complex number pattern of each receive antenna when the terminal device is in a black box mode. In this way, during the downlink MIMO OTA performance test on the terminal device, the channel emulator may emulate, according to the complex number pattern of each receive antenna, signal transmission scenarios of the terminal device when the terminal device is in different directions, so as to ensure that the base station simulator can finally obtain downlink throughputs of the terminal device when the terminal device is in different directions.

In some embodiments, the system further includes:

a second signal analyzer 405, configured to determine a downlink radiation channel matrix of the terminal device;

a first processing device 406, configured to obtain the downlink radiation channel matrix from the second signal analyzer 405, and calculate an inverse matrix of the downlink radiation channel matrix to obtain a downlink radiation channel inverse matrix; and the channel emulator 402 is further configured to obtain the downlink radiation channel inverse matrix from the first processing device 406.

When the second signal analyzer 405 determines the downlink radiation channel matrix of the terminal device, the terminal device 403 is further configured to: determine a smaller value n between a quantity of receive antennas of the terminal device and a quantity of downlink ports of the base station simulator, select n receive antennas from the multiple receive antennas, and sequentially transmit the monophonic signal according to a specified sequence by using all of the n receive antennas.

The second signal analyzer 405 is specifically configured to:

when the terminal device transmits the monophonic signal by using each receive antenna, separately connect to n downlink antennas in the anechoic chamber, and measure a signal received by each of the n downlink antennas;

generate a signal vector specific to each receive antenna according to the signals measured from the n downlink antennas; and generate the downlink radiation channel matrix according to the generated signal vector specific to each of the n receive antennas.

Apparently, when the second signal analyzer 405 in the system may determine the downlink radiation channel matrix of the terminal device, the terminal device 403 has a function of implementing the signal sending method for the terminal device shown in FIG. 1, that is, a function of transmitting the monophonic signal of the designated frequency by using any specified antenna.

As shown in the figure, when the terminal device 403 transmits the monophonic signal by using the first receive antenna of the n receive antennas, the second signal analyzer 405 is first connected to the first downlink antenna of the n downlink antennas, and measures a signal of the first downlink antenna to obtain $h_{11}$, then the second signal analyzer 405 is connected to the second downlink antenna of the n downlink antennas, and measures a signal of the second downlink antenna to obtain $h_{12}$, and so on, until a signal of the $n^{th}$ downlink antenna of the n downlink antennas is measured to obtain $h_{1n}$. When the first receive antenna transmits the monophonic signal, a signal vector ($h_{11}$, $h_{12}$ ... $h_{1n}$) specific to the first receive antenna is generated according to measurement results of signals of the n downlink antennas.

When the terminal device 403 transmits the monophonic signal by using any other of the n receive antennas, the second signal analyzer 405 continues to use the foregoing method to obtain a signal vector specific to each of the n receive antennas.

The second signal analyzer 405 generates the downlink radiation channel matrix according to the generated signal vector specific to each of the n receive antennas, where the downlink channel matrix is as follows:

$$H = \begin{pmatrix} h_{11} & \cdots & h_{1n} \\ \vdots & \ddots & \cdots \\ h_{n1} & \cdots & h_{nn} \end{pmatrix}.$$

After determining the downlink radiation channel matrix, the second signal analyzer 405 sends the downlink radiation channel matrix to the first processing device 406. The first processing device 406 obtains the downlink radiation channel matrix from the second signal analyzer 405, calculates an inverse matrix of the downlink radiation channel matrix to obtain a downlink radiation channel inverse matrix, and sends the downlink radiation channel inverse matrix to the channel emulator 402.

It may be determined, according to the following formula, that the downlink radiation channel inverse matrix determined according to the foregoing radiation test may be used as a downlink channel inverse matrix of a conduction test. That is, the downlink radiation channel inverse matrix may be used by the channel emulator 102 to perform channel emulation processing on a downlink test signal.

$$\begin{pmatrix} y_1 \\ \vdots \\ y_n \end{pmatrix} = \begin{pmatrix} h_{11} & \cdots & h_{1n} \\ \vdots & \ddots & \cdots \\ h_{n1} & \cdots & h_{nn} \end{pmatrix} \begin{pmatrix} g_{11} & \cdots & g_{1n} \\ \vdots & \ddots & \cdots \\ g_{n1} & \cdots & g_{nn} \end{pmatrix} \begin{pmatrix} f(x_1) \\ \vdots \\ f(x_n) \end{pmatrix} =$$

$$\begin{pmatrix} 1 & \cdots & 0 \\ \vdots & \ddots & \cdots \\ 0 & \cdots & 1 \end{pmatrix} \begin{pmatrix} f(x_1) \\ \vdots \\ f(x_n) \end{pmatrix} = \begin{pmatrix} f(x_1) \\ \vdots \\ f(x_n) \end{pmatrix},$$

where $$\begin{pmatrix} y_1 \\ \vdots \\ y_n \end{pmatrix}$$

is signals of the n receive antennas of the terminal device when the conductive test is performed, $$\begin{pmatrix} f(x_1) \\ \vdots \\ f(x_n) \end{pmatrix}$$

is signals of the n receive antennas of the terminal device when a radiation test is performed, and $$\begin{pmatrix} g_{11} & \cdots & g_{1n} \\ \vdots & \ddots & \vdots \\ g_{n1} & \cdots & g_{nn} \end{pmatrix}$$

is the downlink radiation channel inverse matrix.

In some embodiments, the first signal analyzer 404 is further configured to:

after determining the complex number pattern of each of the multiple receive antennas of the terminal device, determine, according to complex number patterns of any two of the multiple receive antennas, an antenna envelope correlation coefficient of the two receive antennas.

A method and a formula used when the first signal analyzer 404 determines the antenna envelope correlation coefficient of the any two receive antennas are respectively the same as those used when the first signal analyzer 202 in the measurement system for the antenna complex number pattern of the terminal device shown in FIG. 2 determines the antenna envelope correlation coefficient of the any two receive antennas. Details are not repeated herein.

In an existing MIMO OTA test method, complex number patterns of any two receive antennas cannot be directly measured. In the system provided in this embodiment of the present invention, according to the foregoing method, after determining the complex number pattern of each of the multiple receive antennas of the terminal device 403, the first signal analyzer 404 may determine the antenna envelope correlation coefficient of the any two receive antennas according to the complex number patterns of the two of the multiple receive antennas.

In the MIMO OTA performance test system provided in this embodiment of the present invention, the base station simulator may send multiple streams of downlink test signals, and the terminal device may receive, by using multiple receive antennas, the multiple streams of processed downlink test signals that are sent by the channel emulator by using multiple downlink antennas, without limiting a quantity of streams of downlink test signals, a quantity of downlink antennas, and a quantity of receive antennas of the terminal device. Therefore, the MIMO OTA performance test system provided in this embodiment of the present invention can support an a×b downlink MIMO test, where both a and b are positive integers greater than or equal to 2. Apparently, the MIMO OTA performance test system provided in this embodiment of the present invention can test a throughput of a terminal device having multiple receive channels, and has relatively high applicability.

In an existing MIMO OTA performance test method, only a downlink throughput of a terminal device can be tested, and an uplink throughput of the terminal device cannot be tested. As a result, uplink operating performance of the terminal device cannot be accurately obtained.

Figure 5:
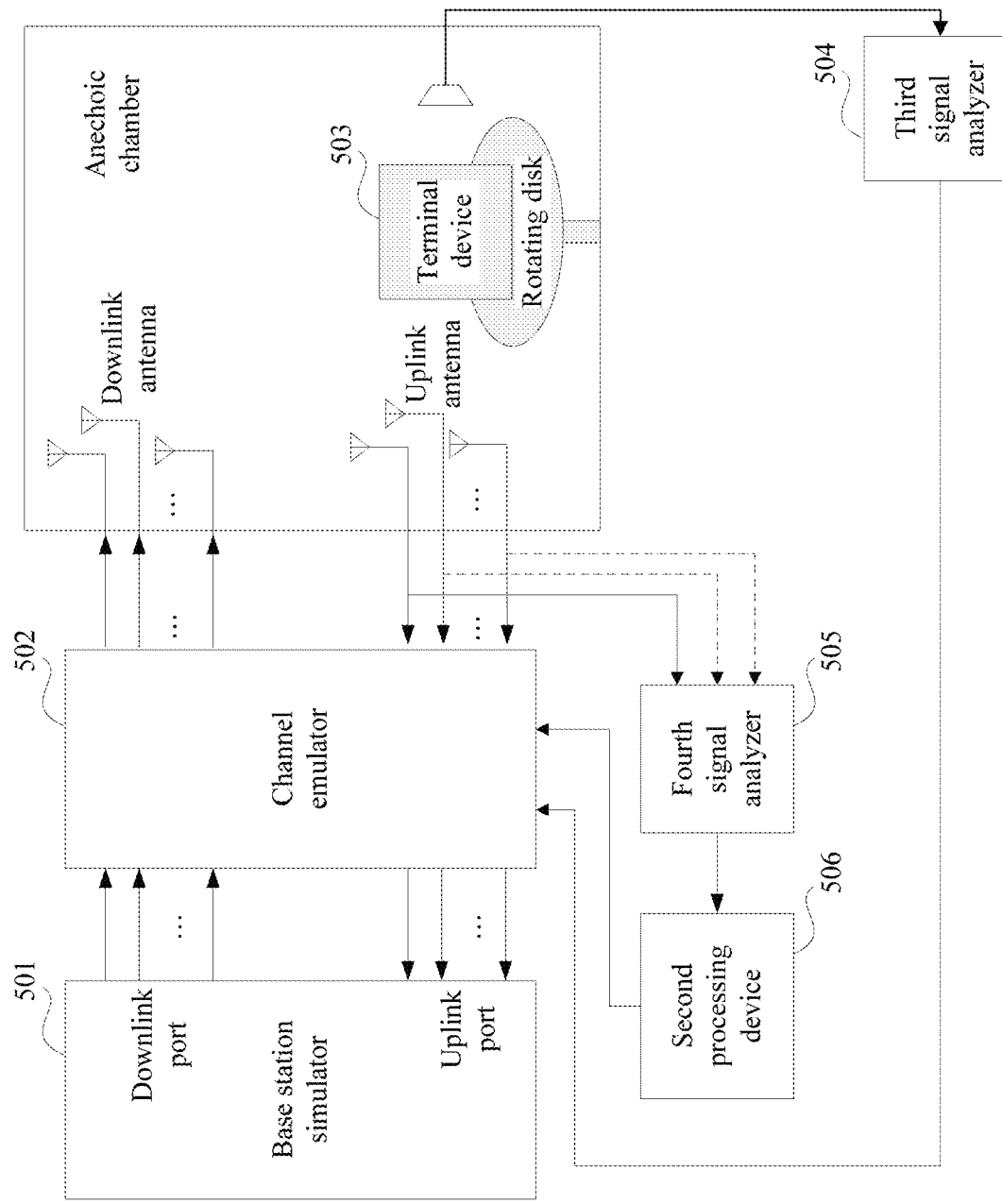
FIG. 5 is an architecture diagram of another MIMO OTA performance test system according to an embodiment of the present invention.

To accurately measure an uplink throughput of a terminal device, an embodiment of the present invention further provides another MIMO OTA performance test system. Referring to FIG. 5, a system architecture of the system includes a base station simulator 501, a channel emulator 502, and a terminal device 503 in an anechoic chamber. The anechoic chamber in which the terminal device 503 is located may be a general-purpose SISO OTA anechoic chamber, an anechoic chamber using a great circle cut test method, or an anechoic chamber using a conical cut test method. The anechoic chamber used in this embodiment of the present invention is the general-purpose SISO OTA anechoic chamber, and only an appropriate quantity of test antennas (uplink antennas) needs to be added. Therefore, costs are reduced.

When the system architecture is used to perform an uplink MIMO OTA performance test on the terminal device, the terminal device 503 is configured to transmit multiple streams of uplink test signals by using multiple transmit antennas of the terminal device 503, and transmit the multiple streams of uplink test signals to the channel emulator 502 by using multiple uplink antennas in the anechoic chamber.

The channel emulator 502 is configured to perform channel emulation processing on the multiple streams of uplink test signals according to a complex number pattern of each of the multiple transmit antennas of the terminal device 503, the uplink radiation channel inverse matrix, and a specified uplink channel fading model, and send the multiple streams of processed uplink test signals to the base station simulator 501.

The base station simulator 501 is configured to receive, by using multiple uplink ports, the multiple streams of processed uplink test signals that are sent by the channel emulator 502, and determine an uplink throughput of the terminal device 503 according to a quantity of streams of uplink test signals that are sent by the terminal device 503 and a quantity of streams of processed uplink test signals that are received by the base station simulator 501.

The specified uplink channel fading model in the channel emulator 502 may be an SCME Umi, an SCME Uma, or another channel fading model.

That the base station simulator 501 determines an uplink throughput of the terminal device 503 according to a quantity of streams of uplink test signals that are sent by the terminal device 503 and a quantity of streams of processed uplink test signals that are received by the base station simulator 501 includes:

using, by the base station simulator 501, a quotient obtained by dividing the quantity of the streams of received processed uplink test signals by the quantity of the streams of uplink test signals that are sent by the terminal device 503, as the uplink throughput of the terminal device 503.

In some embodiments, the system further includes:

a third signal analyzer 504, configured to determine the complex number pattern of each transmit antenna; and the channel emulator 502 is further configured to obtain the complex number pattern of each transmit antenna from the third signal analyzer.

When the third signal analyzer 504 determines the complex number pattern of each transmit antenna, the terminal device 503 is further configured to sequentially transmit a monophonic signal according to a specified sequence by using all of the multiple transmit antennas; and the third signal analyzer 504 is specifically configured to perform the following operations specific to each transmit antenna:

separately measuring amplitudes and phases of the monophonic signal on an I channel and a Q channel in each measurement direction of a three-dimensional radiation spherical surface, where the monophonic signal is transmitted by the transmit antenna; and obtaining the complex number pattern of the transmit antenna according to the amplitudes and the phases, obtained by means of measurement specific to the receive antenna, on the I channel and the Q channel in each measurement direction of the three-dimensional radiation spherical surface.

Apparently, when the third signal analyzer 504 in the system may determine the complex number pattern of each transmit antenna, the terminal device 503 has a function of implementing the signal sending method for the terminal device shown in FIG. 1, that is, a function of transmitting the monophonic signal of a designated frequency by using any specified antenna.

A function of the third signal analyzer 50, a test procedure, and a measurement direction adjustment manner that are used when the third signal analyzer 504 measures the complex number pattern of each transmit antenna are respectively the same as those used when the third signal analyzer 302 in the measurement system for the antenna complex number pattern of the terminal device shown in FIG. 3 measures the complex number pattern of each receive antenna. Details are not repeated herein.

According to the foregoing manner, the first signal analyzer can directly and accurately determine the complex number pattern of each transmit antenna when the terminal device is in a black box mode. In this way, during the uplink MIMO OTA performance test on the terminal device, the channel emulator may emulate, according to the complex number pattern of each transmit antenna, signal transmission scenarios of the terminal device when the terminal device is in different directions, so as to ensure that the base station simulator can finally obtain uplink throughputs of the terminal device when the terminal device is in different directions.

In some embodiments, the system further includes:
a fourth signal analyzer 505, configured to determine an uplink radiation channel matrix of the terminal device; and
a second processing device 506, configured to obtain the uplink radiation channel matrix from the fourth signal analyzer 505, and calculate an inverse matrix of the uplink radiation channel matrix to obtain an uplink radiation channel inverse matrix, where
the channel emulator 502 is further configured to obtain the uplink radiation channel inverse matrix from the second processing device.

When the fourth signal analyzer 505 determines the uplink radiation channel matrix of the terminal device, the terminal device 503 is further configured to: determine a smaller value m between a quantity of transmit antennas of the terminal device and a quantity of uplink ports of the base station simulator, select m transmit antennas from the multiple transmit antennas, and sequentially transmit the monophonic signal according to the specified sequence by using all of the m transmit antennas; and
the fourth signal analyzer 505 is specifically configured to:
when the terminal device transmits the monophonic signal by using each transmit antenna, separately connect to m uplink antennas in the anechoic chamber, and measure a signal received by each of the m uplink antennas;
generate a signal vector specific to each transmit antenna according to the signals measured from the m uplink antennas; and
generate the uplink radiation channel matrix according to the generated signal vector specific to each of the m transmit antennas.

Apparently, when the fourth signal analyzer 505 in the system may determine the uplink radiation channel matrix of the terminal device, the terminal device 503 has a function of implementing the signal sending method for the terminal device shown in FIG. 1, that is, a function of transmitting the monophonic signal of the designated frequency by using any specified antenna.

A step used when the fourth signal analyzer 505 determines the uplink radiation channel matrix of the terminal device 503 in the system provided in this embodiment of the present invention is the same as that used when the second signal analyzer 405 determines the downlink radiation channel matrix of the terminal device 403 in the MIMO OTA test system shown in FIG. 4. Details are not repeated herein.

In some embodiments, the third signal analyzer 504 is further configured to:
after determining the complex number pattern of each of the multiple transmit antennas of the terminal device, determine, according to complex number patterns of any two of the multiple transmit antennas, an antenna envelope correlation coefficient of the two transmit antennas.

A method and a formula that are used when the third signal analyzer 504 determines the antenna envelope correlation coefficient of the any two transmit antennas are respectively the same as those used when the third signal analyzer 302 in the measurement system for the antenna complex number pattern of the terminal device shown in FIG. 3 determines the antenna envelope correlation coefficient of the any two transmit antennas. Details are not repeated herein.

According to the MIMO OTA performance test system provided in this embodiment of the present invention, the uplink throughput of the terminal device can be accurately measured, so as to accurately obtain uplink operating performance of the terminal device.

Figure 6:
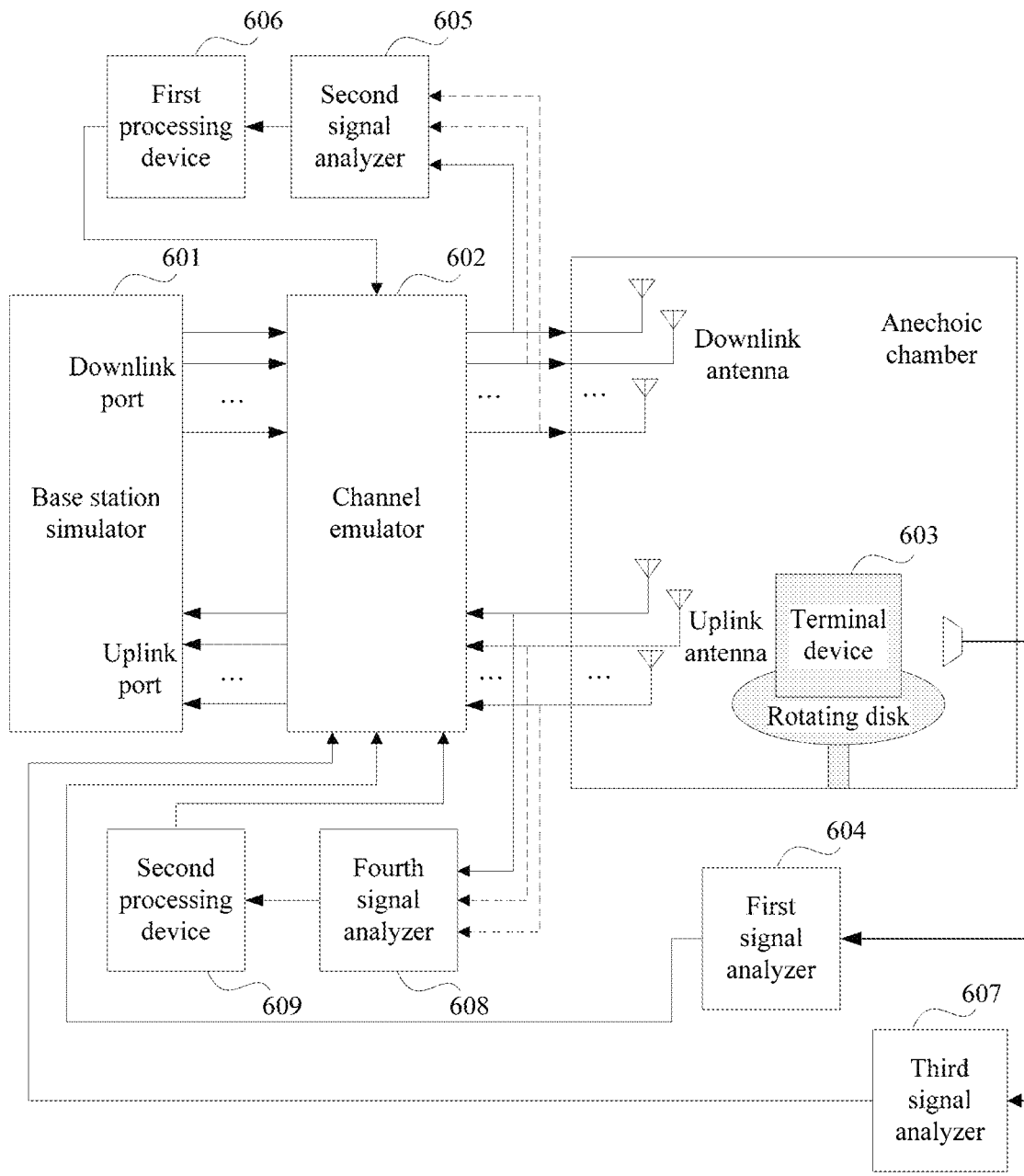
FIG. 6 is an architecture diagram of another MIMO OTA performance test system according to an embodiment of the present invention.

Based on the foregoing embodiment, an embodiment of the present invention further provides a MIMO OTA performance test system. The system can measure an uplink throughput of a terminal device, and can also measure a downlink throughput of the terminal device. As shown in FIG. 6, a system architecture of the system includes a base station simulator 601, a channel emulator 602, and a terminal device 603 in an anechoic chamber.

In some embodiments, the system may further include a first signal analyzer 604, configured to determine a complex number pattern of each receive antenna.

In some embodiments, the system may further include a second signal analyzer 605, configured to determine a downlink radiation channel matrix of the terminal device 603.

Correspondingly, the system further includes a first processing device 606, configured to obtain the downlink radiation channel matrix from the second signal analyzer 605, and calculate an inverse matrix of the downlink radiation channel matrix to obtain a downlink radiation channel inverse matrix.

In some embodiments, the system may further include a third signal analyzer 607, configured to determine a complex number pattern of each transmit antenna.

In some embodiments, the system may further include a fourth signal analyzer 608, configured to determine an uplink radiation channel matrix of the terminal device 603.

Correspondingly, the system further includes a second processing device 609, configured to obtain the uplink radiation channel matrix from the fourth signal analyzer 608, and calculate an inverse matrix of the uplink radiation channel matrix to obtain an uplink radiation channel inverse matrix.

For a function of each related device used when the system measures the downlink throughput of the terminal device 603, refer to a function of a corresponding device in the embodiment shown in FIG. 4. For a function of each related device used when the system measures the uplink throughput of the terminal device 603, refer to a function of a corresponding device in the embodiment shown in FIG. 5. Details are not repeated herein.

In the MIMO OTA performance test system provided in this embodiment of the present invention, the first signal analyzer 604 and the third signal analyzer 607 test the complex number pattern of each transmit antenna and the complex number pattern of each transmit antenna, respectively. Therefore, the first signal analyzer 604 and the third signal analyzer 607 may be a same signal analyzer. Similarly, the second signal analyzer 605 and the fourth signal analyzer 608 may be a same signal analyzer. In some embodiments, the first signal analyzer 604, the second signal analyzer 605, the third signal analyzer 607, and the fourth signal analyzer 608 may be a same signal analyzer. This is not limited in this embodiment of the present invention. Each signal analyzer used in the present invention may alternatively be a multi-input network analyzer.

In the MIMO OTA performance test system provided in this embodiment of the present invention, the first processing device 606 and the second processing device 609 may be a same processing device. This is not limited in this embodiment of the present invention.

In conclusion, the MIMO OTA performance test system provided in this embodiment of the present invention not only can measure a throughput of a terminal device having multiple receive channels, but also can measure a throughput of a terminal device having multiple transmit channels. Compared with a prior-art multi-probe anechoic chamber test method, there is no need to configure two channel simulators for each antenna of the terminal device. Apparently, the present invention can reduce test costs. In addition, according to the system provided in this embodiment of the present invention, the complex number pattern of each receive antenna and the complex number pattern of each transmit antenna of the terminal can further be directly measured, the downlink radiation channel matrix and the uplink radiation channel matrix can further be directly measured to further obtain the downlink radiation channel inverse matrix and the downlink radiation channel inverse matrix. In addition, the obtained parameters are more accurate. This finally improves accuracy of a MMO OTA performance test result.

Figure 7:
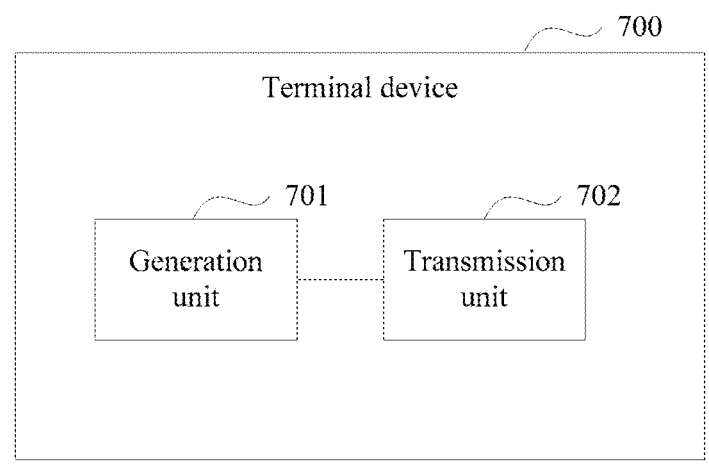
FIG. 7 is a schematic structural diagram of a terminal device according to an embodiment of the present invention.

Based on the foregoing embodiment, an embodiment of the present invention further provides a terminal device. The terminal device is configured to implement the signal sending method shown in FIG. 1. Referring the FIG. 7, the terminal device 700 includes a generation unit 701 and a transmission unit 702.

The generation unit 701 is configured to generate a monophonic signal of a specified frequency.

The transmission unit 702 is configured to transmit the monophonic signal by using a specified antenna of the terminal device 700, where the specified antenna is a receive antenna or a transmit antenna of the terminal device.

In some embodiments, the monophonic signal is a monophonic continuous wave signal of constant amplitude.

In some embodiments, the transmission unit 702 is further configured to:

before sending the monophonic signal by using the specified antenna, enable an antenna selection switch of the specified antenna, and disable antenna selection switches of other receive antenna and transmit antenna different from the specified antenna.

Using the terminal device provided in this embodiment of the present invention, the terminal device can generate the monophonic signal of the specified frequency, and can transmit the monophonic signal by using the specified receive antenna or transmit antenna of the terminal device. The terminal device has a function of transmitting the monophonic signal of the designated frequency by using any specified antenna. Therefore, a measurement system for an antenna complex number pattern of the terminal device can accurately measure a complex number pattern of each antenna of the terminal device in a manner in which the terminal device transmits the monophonic signal of the specified frequency by using each receive antenna or transmit antenna. The measurement system can further obtain an accurate measurement result when a MIMO OTA performance test is performed on the terminal device according to the complex number patterns of all the antennas of the terminal device.

Figure 8:
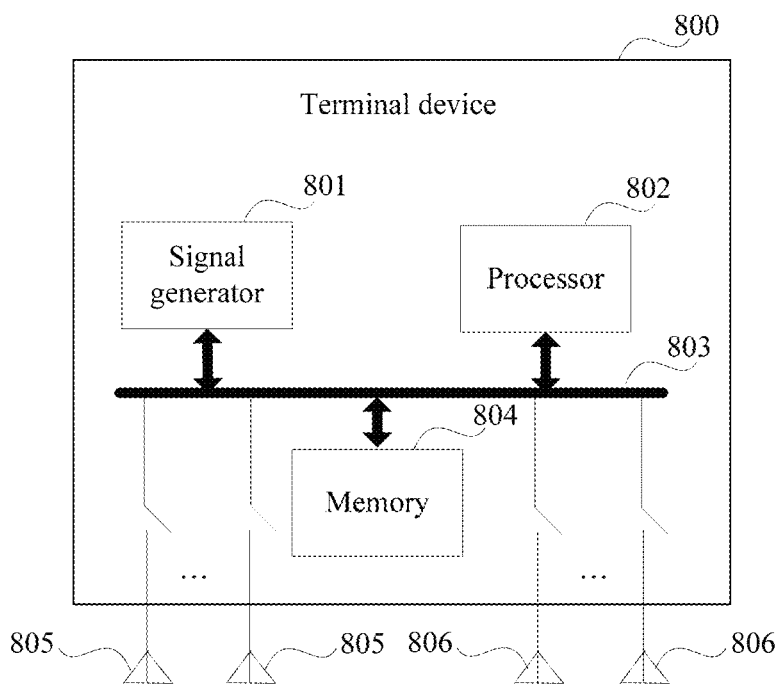
FIG. 8 is a schematic structural diagram of another terminal device according to an embodiment of the present invention.

Based on the foregoing embodiment, an embodiment of the present invention provides a terminal device. The terminal device is configured to implement the signal sending method shown in FIG. 1. Referring to FIG. 8, the terminal device 800 includes a signal generator 801, a processor 802, a bus 803, a memory 804, and multiple antennas. The multiple antennas include multiple receive antennas 805 and multiple transmit antennas 806, and each antenna has an antenna selection switch.

The signal generator 801, the processor 802, the memory 804, and the multiple antennas are mutually connected by using the bus 803. The bus 803 may be a Peripheral Component Interconnect (peripheral component interconnect, PCI for short) bus, an extended industry standard architecture (extended industry standard architecture, EISA for short) bus, or the like. The bus may be divided into an address bus, a data bus, a control bus, and the like. For ease of representation, the bus is represented by using only a bold line in FIG. 8. However, this does not mean that there is only one bus or one type of bus.

The signal generator 801 is configured to generate a monophonic signal of a specified frequency.

The multiple antennas are configured to transmit the monophonic signal. The receive antenna 805 is further configured to receive a downlink signal, and the transmit antenna 806 is further configured to transmit an uplink signal.

The processor 802 is configured to implement the signal sending method shown in FIG. 1, and the method includes:

controlling the signal generator 801, to enable the signal generator 801 to generate the monophonic signal of the specified frequency; and transmitting the monophonic signal by using a specified antenna of the terminal device, where the specified antenna is the receive antenna 805 or the transmit antenna 806 of the terminal device.

In some embodiments, the monophonic signal is a monophonic continuous wave signal of constant amplitude.

In some embodiments, the processor 802 is further configured to:

before sending the monophonic signal by using the specified antenna, enable an antenna selection switch of the specified antenna, and disable antenna selection switches of other receive antenna 805 and transmit antenna 806 different from the specified antenna.

Using the terminal device provided in this embodiment of the present invention, the terminal device can generate the monophonic signal of the specified frequency, and can transmit the monophonic signal by using the specified receive antenna or transmit antenna of the terminal device. The terminal device has a function of transmitting the monophonic signal of the designated frequency by using any specified antenna. Therefore, a measurement system for an antenna complex number pattern of the terminal device can accurately measure a complex number pattern of each antenna of the terminal device in a manner in which the terminal device transmits the monophonic signal of the specified frequency by using each receive antenna or transmit antenna. The measurement system can further obtain an accurate measurement result when a MIMO OTA performance test is performed on the terminal device according to the complex number patterns of all the antennas of the terminal device.

Based on the foregoing embodiment, an embodiment of the present invention further provides a measurement method for an antenna complex number pattern of a terminal device. The method is applicable to the measurement system for the antenna complex number pattern of the terminal device shown in FIG. 2. A device used in this method may be a corresponding device in the system shown in FIG. 2. Referring to FIG. 9, a procedure of the method includes the following steps.

Step 901: A terminal device sequentially transmits a monophonic signal according to a specified sequence by using all of multiple receive antennas of the terminal device.

Step 902: A first signal analyzer performs the following operations specific to each receive antenna:

separately measuring amplitudes and phases of the monophonic signal on an I channel and a Q channel in each measurement direction of a three-dimensional radiation spherical surface, where the monophonic signal is transmitted by the receive antenna; and obtaining a complex number pattern of the receive antenna according to the amplitudes and the phases, obtained by means of measurement specific to the receive antenna, on the I channel and the Q channel in each measurement direction of the three-dimensional radiation spherical surface.

In some embodiments, after the first signal analyzer obtains the complex number pattern of each receive antenna, the method further includes:

determining, according to complex number patterns of any two of the multiple receive antennas, an antenna envelope correlation coefficient of the two receive antennas.

According to the measurement method for the antenna complex number pattern of the terminal device provided in this embodiment of the present invention, the first signal analyzer can directly and accurately determine the complex number pattern of each receive antenna when the terminal device is in a black box mode. In this way, during a downlink MIMO OTA performance test on the terminal device, a channel emulator may emulate, according to the complex number pattern of each receive antenna, signal transmission scenarios of the terminal device when the terminal device is in different directions, so as to ensure that the base station simulator can finally obtain downlink throughputs of the terminal device when the terminal device is in different directions. Further, in the system, the antenna envelope correlation coefficient of the any two receive antennas of the terminal device in the black box mode can be further determined accurately.

Based on the foregoing embodiment, an embodiment of the present invention further provides a measurement method for an antenna complex number pattern of a terminal device. The method is applicable to the measurement system for the antenna complex number pattern of the terminal device shown in FIG. 3. A device used in this method may be a corresponding device in the system shown in FIG. 3. Referring to FIG. 10, a procedure of the method includes the following steps.

Step 1001: A terminal device sequentially transmits a monophonic signal according to a specified sequence by using all of multiple transmit antennas of the terminal device.

Step 1002: A third signal analyzer performs the following operations specific to each transmit antenna:

separately measuring amplitudes and phases of the monophonic signal on an I channel and a Q channel in each measurement direction of a three-dimensional radiation spherical surface, where the monophonic signal is transmitted by the transmit antenna; and obtaining a complex number pattern of the transmit antenna according to the amplitudes and the phases, obtained by means of measurement specific to the transmit antenna, on the I channel and the Q channel in each measurement direction of the three-dimensional radiation spherical surface.

In some embodiments, after the third signal analyzer obtains the complex number pattern of each transmit antenna, the method further includes:

determining, according to complex number patterns of any two of the multiple transmit antennas, an antenna envelope correlation coefficient of the two transmit antennas.

According to the measurement method for the antenna complex number pattern of the terminal device provided in this embodiment of the present invention, the third signal analyzer can directly and accurately determine the complex number pattern of each transmit antenna when the terminal device is in a black box mode. In this way, during an uplink MIMO OTA performance test on the terminal device, a channel emulator may emulate, according to the complex number pattern of each transmit antenna, signal transmission scenarios of the terminal device when the terminal device is in different directions, so as to ensure that the base station simulator can finally obtain uplink throughputs of the terminal device when the terminal device is in different directions. Further, in the system, the antenna envelope correlation coefficient of the any two transmit antennas of the terminal device in the black box mode can be further determined accurately.

Figure 11:
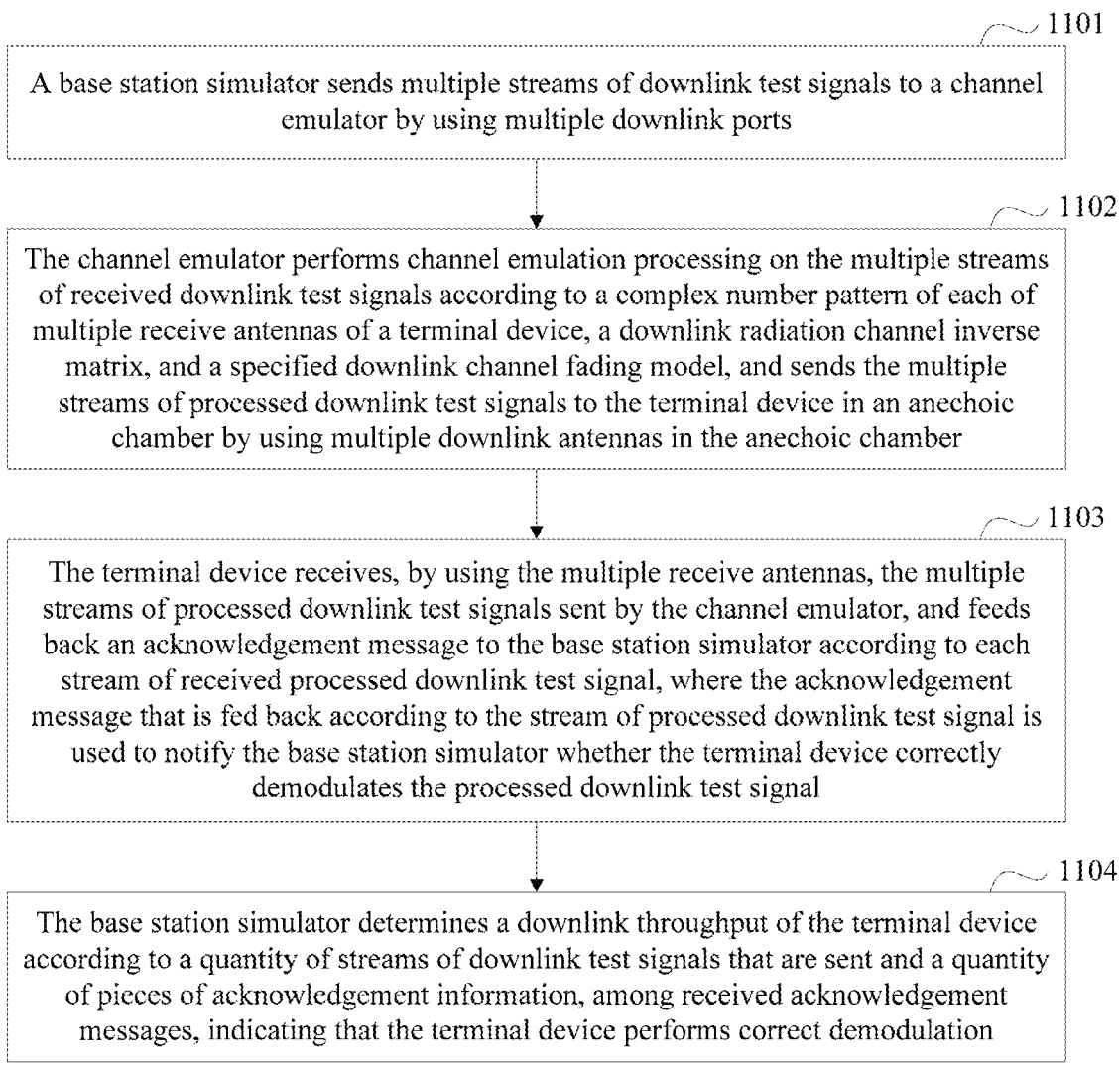
FIG. 11 is a flowchart of a MIMO OTA performance test method according to an embodiment of the present invention.

Based on the foregoing embodiment, an embodiment of the present invention further provides a MIMO OTA performance test method. The method is applicable to the MIMO OTA performance test system shown in FIG. 4. A device used in the method may be a corresponding device in the system shown in FIG. 4. Referring to FIG. 11, a procedure of the method includes the following steps.

Step 1101: A base station simulator sends multiple streams of downlink test signals to a channel emulator by using multiple downlink ports.

Step 1102: The channel emulator performs channel emulation processing on the multiple streams of received downlink test signals according to a complex number pattern of each of multiple receive antennas of a terminal device, a downlink radiation channel inverse matrix, and a specified downlink channel fading model, and sends the multiple streams of processed downlink test signals to the terminal device in an anechoic chamber by using multiple downlink antennas in the anechoic chamber.

Step 1103: The terminal device receives, by using the multiple receive antennas, the multiple streams of processed downlink test signals sent by the channel emulator, and feeds back an acknowledgement message to the base station simulator according to each stream of received processed downlink test signal, where the acknowledgement message that is fed back according to the stream of processed downlink test signal is used to notify the base station simulator whether the terminal device correctly demodulates the processed downlink test signal.

Step 1104: The base station simulator determines a downlink throughput of the terminal device according to a quantity of streams of downlink test signals that are sent and a quantity of pieces of acknowledgement information, among received acknowledgement messages, indicating that the terminal device performs correct demodulation.

In some embodiments, before the performing, by the channel emulator, channel emulation processing on the multiple streams of received downlink test signals, the method further includes:

determining, by a first signal analyzer, the complex number pattern of each receive antenna; and obtaining, by the channel emulator, the complex number pattern of each receive antenna from the first signal analyzer.

In some embodiments, the method further includes:

sequentially transmitting, by the terminal device, a monophonic signal according to a specified sequence by using all of the multiple receive antennas; and the determining, by a first signal analyzer, the complex number pattern of each receive antenna includes:

performing, by the first signal analyzer, the following operations specific to each receive antenna:

separately measuring amplitudes and phases of the monophonic signal on an I channel and a Q channel in each measurement direction of a three-dimensional radiation spherical surface, where the monophonic signal is transmitted by the receive antenna; and obtaining the complex number pattern of the receive antenna according to the amplitudes and the phases, obtained by means of measurement specific to the receive antenna, on the I channel and the Q channel in each measurement direction of the three-dimensional radiation spherical surface.

In some embodiments, before the performing, by the channel emulator, channel emulation processing on the multiple streams of received downlink test signals, the method further includes:

determining, by a second signal analyzer, a downlink radiation channel matrix of the terminal device;

obtaining, by a first processing device, the downlink radiation channel matrix from the second signal analyzer, and calculating an inverse matrix of the downlink radiation channel matrix to obtain a downlink radiation channel inverse matrix; and obtaining, by the channel emulator, the downlink radiation channel inverse matrix from the first processing device.

In some embodiments, the method further includes:

determining, by the terminal device, a smaller value n between a quantity of receive antennas of the terminal device and a quantity of downlink ports of the base station simulator, select n receive antennas from the multiple receive antennas, and sequentially transmitting the monophonic signal according to a specified sequence by using all of the n receive antennas; and the determining, by a second signal analyzer, a downlink radiation channel matrix of the terminal device includes:

when the terminal device transmits the monophonic signal by using each receive antenna, separately connecting to n downlink antennas in the anechoic chamber, and measuring a signal received by each of the n downlink antennas;

generating a signal vector specific to each receive antenna according to the signals measured from the n downlink antennas; and generating the downlink radiation channel matrix according to the generated signal vector specific to each of the n receive antennas.

In some embodiments, after the determining, by a first signal analyzer, the complex number pattern of each receive antenna, the method further includes:

determining, according to complex number patterns of any two of the multiple receive antennas, an antenna envelope correlation coefficient of the two receive antennas.

According to the MIMO OTA performance test method provided in this embodiment of the present invention, the base station simulator may send the multiple streams of downlink test signals, and the terminal device may receive, by using the multiple receive antennas, the multiple streams of processed downlink test signals that are sent by the channel emulator by using the multiple downlink antennas, without limiting a quantity of streams of downlink test signals, a quantity of downlink antennas, and a quantity of receive antennas of the terminal device. Therefore, the MIMO OTA performance test system provided in this embodiment of the present invention can support an a×b downlink MIMO test, where both a and b are positive integers greater than or equal to 2. Apparently, the MIMO OTA performance test system provided in this embodiment of the present invention can test a throughput of a terminal device having multiple receive channels, and has relatively high applicability.

Figure 12:
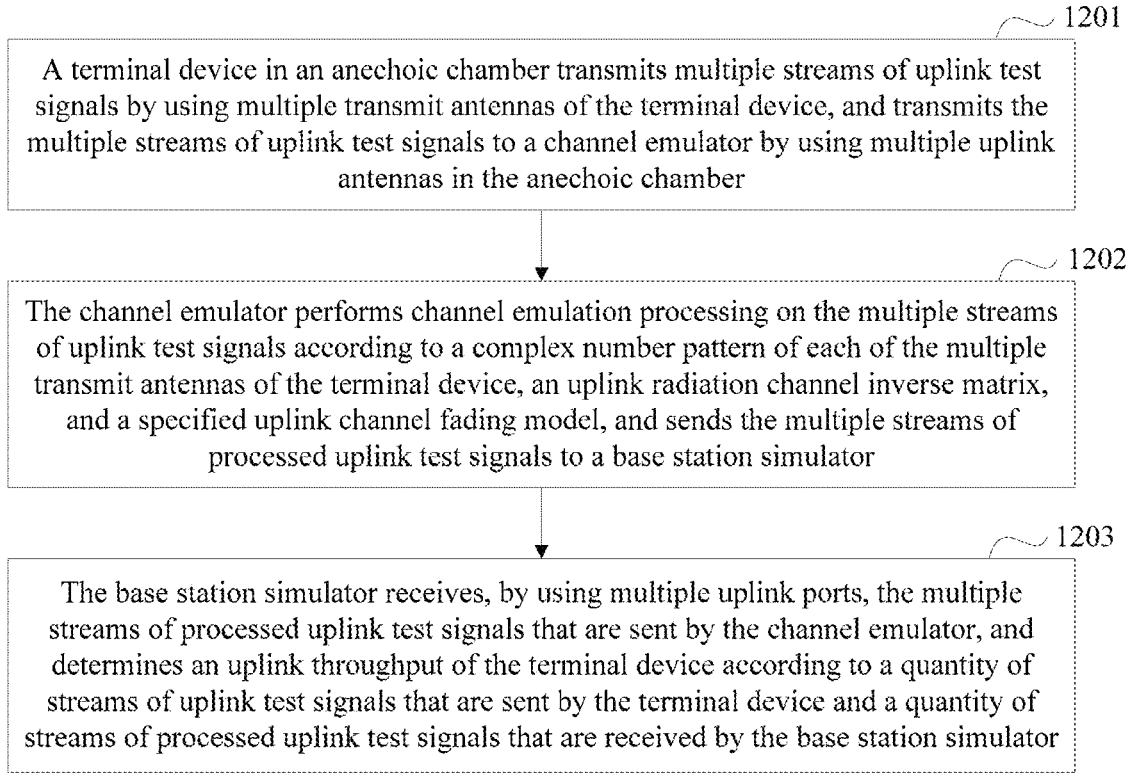
FIG. 12 is a flowchart of another MIMO OTA performance test method according to an embodiment of the present invention.

Based on the foregoing embodiment, an embodiment of the present invention further provides a MIMO OTA performance test method. The method is applicable to the MIMO OTA performance test system shown in FIG. 5. A device used in the method may be a corresponding device in the system shown in FIG. 5. Referring to FIG. 12, a procedure of the method includes the following steps.

Step 1201: A terminal device in an anechoic chamber transmits multiple streams of uplink test signals by using multiple transmit antennas of the terminal device, and transmits the multiple streams of uplink test signals to a channel emulator by using multiple uplink antennas in the anechoic chamber.

Step 1202: The channel emulator performs channel emulation processing on the multiple streams of uplink test signals according to a complex number pattern of each of the multiple transmit antennas of the terminal device, the uplink radiation channel inverse matrix, and a specified uplink channel fading model, and sends the multiple streams of processed uplink test signals to a base station simulator.

Step 1203: The base station simulator receives, by using multiple uplink ports, the multiple streams of processed uplink test signals that are sent by the channel emulator, and determines an uplink throughput of the terminal device according to a quantity of streams of uplink test signals that are sent by the terminal device and a quantity of streams of processed uplink test signals that are received by the base station simulator.

In some embodiments, before the performing, by the channel emulator, channel emulation processing on the multiple streams of uplink test signals, the method further includes:

determining, by a third signal analyzer, the complex number pattern of each transmit antenna; and obtaining, by the channel emulator, the complex number pattern of each transmit antenna from the third signal analyzer.

In some embodiments, the method further includes:

sequentially transmitting, by the terminal device, a monophonic signal according to a specified sequence by using all of the multiple transmit antennas; and the determining, by a third signal analyzer, the complex number pattern of each transmit antenna includes:

performing, by the third signal analyzer, the following operations specific to each transmit antenna:

separately measuring amplitudes and phases of the monophonic signal on an I channel and a Q channel in each measurement direction of a three-dimensional radiation spherical surface, where the monophonic signal is transmitted by the transmit antenna; and obtaining a complex number pattern of the transmit antenna according to the amplitudes and the phases, obtained by means of measurement specific to the receive antenna, on the I channel and the Q channel in each measurement direction of the three-dimensional radiation spherical surface.

In some embodiments, before the performing, by the channel emulator, channel emulation processing on the multiple streams of uplink test signals, the method further includes:

determining, by a fourth signal analyzer, an uplink radiation channel matrix of the terminal device;

obtaining, by a second processing device, the uplink radiation channel matrix from the fourth signal analyzer, and calculating an inverse matrix of the uplink radiation channel matrix to obtain an uplink radiation channel inverse matrix; and obtaining, by the channel emulator, the uplink radiation channel inverse matrix from the second processing device.

In some embodiments, the method further includes:

determining, by the terminal device, a smaller value m between a quantity of transmit antennas of the terminal device and a quantity of uplink ports of the base station simulator, selecting m transmit antennas from the multiple transmit antennas, and sequentially transmitting a monophonic signal according to the specified sequence by using all of the m transmit antennas; and the determining, by a fourth signal analyzer, an uplink radiation channel matrix of the terminal device includes:

when the terminal device transmits the monophonic signal by using each transmit antenna, separately connecting to m uplink antennas in the anechoic chamber, and measuring a signal received by each of the m uplink antennas;

generating a signal vector specific to each transmit antenna according to the signals measured from the m uplink antennas; and generating the uplink radiation channel matrix according to the generated signal vector specific to each of the m transmit antennas.

In some embodiments, after the determining, by a third signal analyzer, the complex number pattern of each transmit antenna, the method further includes:

determining, according to complex number patterns of any two of the multiple transmit antennas, an antenna envelope correlation coefficient of the two transmit antennas.

According to the MIMO OTA performance test system provided in this embodiment of the present invention, the uplink throughput of the terminal device can be accurately measured, so as to accurately obtain uplink operating performance of the terminal device.

In conclusion, according to the signal sending method for the terminal device and the terminal device that are provided in the embodiments of the present invention, the terminal device can generate a monophonic signal of a specified frequency, and can transmit the monophonic signal by using a specified receive antenna or transmit antenna of the terminal device. The terminal device has a function of transmitting the monophonic signal of the designated frequency by using any specified antenna. Therefore, a measurement system for an antenna complex number pattern of the terminal device can accurately measure a complex number pattern of each antenna of the terminal device in a manner in which the terminal device transmits the monophonic signal of the specified frequency by using each receive antenna or transmit antenna. The measurement system can further obtain an accurate measurement result when a MIMO OTA performance test is performed on the terminal device according to the complex number patterns of all the antennas of the terminal device.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The embodiments of the present invention are intended to cover these modifications and variations provided that they fall within the scope of protection defined by the following claims and their equivalent technologies.

What is claimed is:

1. A Multiple Input Multiple Output (MIMO) Over The Air (OTA) performance test system, comprising a base station simulator, a channel emulator, and a terminal device, wherein:

the base station simulator is configured to send multiple streams of downlink test signals to a channel emulator through multiple downlink ports;

the channel emulator is configured to:

perform channel emulation processing on the multiple streams of received downlink test signals according to a complex number pattern of each multiple receive antennas of a terminal device, a downlink radiation channel inverse matrix, and a specified downlink channel fading model, and send the multiple streams of processed downlink test signals to the terminal device in an anechoic chamber by using multiple downlink antennas in the anechoic chamber; and the terminal device is configured to:

receive, by using the multiple receive antennas, the multiple streams of processed downlink test signals sent by the channel emulator, and feedback an acknowledgement message to the base station simulator according to each stream of received processed downlink test signal, wherein the acknowledgement message fed back according to the stream of processed downlink test signal includes information for facilitating notifying the base station simulator whether the terminal device correctly demodulates the processed downlink test signal, wherein the base station simulator is further configured to determine a downlink throughput of the terminal device according to a quantity of streams of downlink test signals that are sent and a quantity of pieces of acknowledgement information, among received acknowledgement messages, indicating that the terminal device performs correct demodulation and the system further comprises at least a first signal analyzer configured to determine the complex number pattern of each receive antenna; and the channel emulator is further configured to obtain the complex number pattern of each receive antenna from the first signal analyzer, and the terminal device is further configured to sequentially transmit a monophonic signal according to a specified sequence by using all of the multiple receive antennas; and the first signal analyzer is configured to perform the following for each receive antenna:

separately measuring amplitudes and phases of the monophonic signal on an in-phase I channel and a quadrature Q channel in each measurement direction of a three-dimensional radiation spherical surface, wherein the monophonic signal is transmitted by the receive antenna; and obtaining the complex number pattern of the receive antenna according to the amplitudes and the phases, obtained by means of measurement specific to the receive antenna, on the I channel and the Q channel in each measurement direction of the three-dimensional radiation spherical surface.

2. The system of claim 1, wherein the system further comprises:

a second signal analyzer, configured to determine a downlink radiation channel matrix of the terminal device; and a first processing device, configured to obtain the downlink radiation channel matrix from the second signal analyzer, and calculate an inverse matrix of the downlink radiation channel matrix to obtain a downlink radiation channel inverse matrix, wherein the channel emulator is further configured to obtain the downlink radiation channel inverse matrix from the first processing device.

3. The system according to claim 2, wherein the terminal device is further configured to: determine a smaller value n between a quantity of receive antennas of the terminal device and a quantity of downlink ports of the base station simulator, select n receive antennas from the multiple receive antennas, and sequentially transmit the monophonic signal according to a specified sequence by using all of the n receive antennas; and the second signal analyzer is configured to:

when the terminal device transmits the monophonic signal through each receive antenna, separately connect to n downlink antennas in the anechoic chamber, and measure a signal received by each of the n downlink antennas;

generate a signal vector for each receive antenna according to the signals measured from the n downlink antennas; and generate the downlink radiation channel matrix according to the generated signal vector for each of the n receive antennas.

4. The system of claim 1, wherein the first signal analyzer is further configured to:

after determining the complex number pattern of each of the multiple receive antennas of the terminal device, determine, according to complex number patterns of any two of the multiple receive antennas, an antenna envelope correlation coefficient of the two receive antennas.

5. A Multiple Input Multiple Output (MIMO) Over The Air (OTA) performance test system, comprising:

a terminal device in an anechoic chamber, configured to transmit multiple streams of uplink test signals by using multiple transmit antennas of the terminal device, and transmit the multiple streams of uplink test signals to a channel emulator through multiple uplink antennas in the anechoic chamber;

the channel emulator, configured to perform channel emulation processing on the multiple streams of uplink test signals according to a complex number pattern of each of the multiple transmit antennas of the terminal device, the uplink radiation channel inverse matrix, and a specified uplink channel fading model, and send the multiple streams of processed uplink test signals to a base station simulator;

the base station simulator, configured to receive, through multiple uplink ports, the multiple streams of processed uplink test signals that are sent by the channel emulator, and determine an uplink throughput of the terminal device according to a quantity of streams of uplink test signals that are sent by the terminal device and a quantity of streams of processed uplink test signals that are received by the base station simulator, and a third signal analyzer, configured to determine the complex number pattern of each transmit antenna; and the channel emulator is further configured to obtain the complex number pattern of each transmit antenna from the third signal analyzer, wherein the terminal device is further configured to sequentially transmit a monophonic signal according to a specified sequence by using all of the multiple transmit antennas; and the third signal analyzer is configured to perform the following operations for each transmit antenna:

separately measuring amplitudes and phases of the monophonic signal on an in-phase I channel and a quadrature Q channel in each measurement direction of a three-dimensional radiation spherical surface, wherein the monophonic signal is transmitted by the transmit antenna; and obtaining the complex number pattern of the transmit antenna according to the amplitudes and the phases, obtained by means of measurement specific to the receive antenna, on the I channel and the Q channel in each measurement direction of the three-dimensional radiation spherical surface.

6. The system of claim 5, wherein the system further comprises:

a fourth signal analyzer, configured to determine an uplink radiation channel matrix of the terminal device; and a second processing device, configured to obtain the uplink radiation channel matrix from the fourth signal analyzer, and calculate an inverse matrix of the uplink radiation channel matrix to obtain an uplink radiation channel inverse matrix, wherein the channel emulator is further configured to obtain the uplink radiation channel inverse matrix from the second processing device.

7. The system according to claim 6, wherein the terminal device is further configured to: determine a smaller value m between a quantity of transmit antennas of the terminal device and a quantity of uplink ports of the base station simulator, select m transmit antennas from the multiple transmit antennas, and sequentially transmit the monophonic signal according to the specified sequence by using all of the m transmit antennas; and the fourth signal analyzer is configured to:

when the terminal device transmits the monophonic signal by using each transmit antenna, separately connect to m uplink antennas in the anechoic chamber, and measure a signal received by each of the m uplink antennas;

generate a signal vector specific to each transmit antenna according to the signals measured from the m uplink antennas; and generate the uplink radiation channel matrix according to the generated signal vector specific to each of the m transmit antennas.

8. The system of claim 5, wherein the third signal analyzer is further configured to:

after determining the complex number pattern of each of the multiple transmit antennas of the terminal device, determine, according to complex number patterns of any two of the multiple transmit antennas, an antenna envelope correlation coefficient of the two transmit antennas.

* * * * *